United States Patent
Leclair et al.

(10) Patent No.: US 10,558,223 B2
(45) Date of Patent: Feb. 11, 2020

(54) AUTONOMOUS VEHICLE FOR PUSHING FEED, METHODS AND SYSTEMS THEREOF

(71) Applicant: ROVIBEC INC., Nicolet (CA)

(72) Inventors: Francis Leclair, Nicolet (CA); Pascal Leclerc, Nicolet (CA); Marc-Antoine Durand, Nicolet (CA); Richard Fleurent, Nicolet (CA); Marjolaine Marcotte, Nicolet (CA); Yvon Therrien, Nicolet (CA); Jean-Pierre Malleret, Nicolet (CA); Kevin Rousseau, Nicolet (CA); Victor Rousseau, Nicolet (CA); Martin Rousseau, Nicolet (CA); Claude Beauregard, Nicolet (CA)

(73) Assignee: ROVIBEC INC., Nicolet (CA)

( * ) Notice: Subject to any disclaimer, the term of this patent is extended or adjusted under 35 U.S.C. 154(b) by 7 days.

(21) Appl. No.: 16/171,900

(22) Filed: Oct. 26, 2018

(65) Prior Publication Data
US 2019/0129443 A1 May 2, 2019

Related U.S. Application Data

(60) Provisional application No. 62/577,432, filed on Oct. 26, 2017.

(30) Foreign Application Priority Data

Oct. 26, 2017 (CA) ..................... 2983986

(51) Int. Cl.
*G05D 1/02* (2006.01)
*A01K 1/10* (2006.01)
*A01K 5/02* (2006.01)

(52) U.S. Cl.
CPC .......... *G05D 1/0259* (2013.01); *A01K 1/105* (2013.01); *A01K 5/0266* (2013.01); *G05D 1/0212* (2013.01); *G05D 2201/0201* (2013.01)

(58) Field of Classification Search
CPC ..................................... G05D 1/0259
See application file for complete search history.

(56) References Cited

U.S. PATENT DOCUMENTS 3,777,670 A 12/1973 Blochlinger
4,044,853 A 8/1977 Melke
(Continued)

FOREIGN PATENT DOCUMENTS

AT 006016 3/2003
CA 2645372 10/2007
(Continued)

OTHER PUBLICATIONS

English Abstract of NL7901058(A), "Stalled cattle feeding equipment—has metering mechanism travelling in guides along stalls", published on Aug. 12, 1980.
(Continued)

*Primary Examiner* — Alex C Dunn
(74) *Attorney, Agent, or Firm* — Bereskin & Parr LLP/S.E.N.C.R.L., s.r.l.

(57) ABSTRACT

There is provided an autonomous vehicle for pushing feed lying on a floor, comprising a frame; a skirt rotatably connected to the frame, wherein a bottom portion of the skirt continuously contacts the floor to push the feed. The vehicle comprises a sensor assembly for detecting a magnetic field emitted from a magnetic guiding element inserted in the floor and a control unit mounted for directing rotation of the skirt and for guiding the vehicle along a predetermined path formed by the magnetic guiding element. Also provided is an autonomous vehicle with a skirt drive mechanism
(Continued)

mounted to the frame for driving rotation of the skirt, and an autonomous vehicle comprising a prism-shaped skirt rotatably connected to the frame. There is also provided methods for installing a magnetically guided autonomous vehicle and for pushing feed using an autonomous vehicle, as well as systems and kits comprising said vehicle.

21 Claims, 17 Drawing Sheets

(56) References Cited

U.S. PATENT DOCUMENTS

| | | | |
|---|---|---|---|
| 4,078,630 | A | 3/1978 | Krieg |
| 4,532,385 | A | 7/1985 | Friske |
| 4,541,051 | A | 9/1985 | Jarret et al. |
| 4,588,041 | A | 5/1986 | Tsuchihashi |
| 4,607,575 | A | 8/1986 | Bryda |
| 4,864,207 | A | 9/1989 | Miura et al. |
| 5,000,279 | A * | 3/1991 | Kondo ............... B62D 1/28 180/168 |
| 5,007,496 | A | 4/1991 | Whitten et al. |
| 5,091,855 | A | 2/1992 | Umehara et al. |
| 5,341,130 | A | 8/1994 | Yardley et al. |
| 5,467,084 | A | 11/1995 | Alofs et al. |
| 5,525,884 | A | 6/1996 | Sugiura et al. |
| 5,650,703 | A | 7/1997 | Yardley et al. |
| 5,672,947 | A | 9/1997 | Hisada et al. |
| 5,764,014 | A | 6/1998 | Jakeway et al. |
| 5,816,192 | A | 10/1998 | van der Lely et al. |
| 6,345,217 | B1 | 2/2002 | Zeitler et al. |
| 8,694,191 | B2 | 4/2014 | Van Den Berg |
| 9,655,343 | B2 | 5/2017 | Hendricus |
| 9,682,352 | B2 | 6/2017 | Liet |
| 2003/0106731 | A1 | 6/2003 | Marino et al. |
| 2005/0021195 | A1 | 1/2005 | Zeitler et al. |
| 2007/0227455 | A1* | 10/2007 | Sumiya ............... A01K 1/105 119/57.92 |
| 2009/0128139 | A1 | 5/2009 | Drenth et al. |
| 2010/0230183 | A1 | 9/2010 | Van Den Berg |
| 2010/0326363 | A1* | 12/2010 | Van Den Berg ....... A01K 1/105 119/57.92 |
| 2011/0185975 | A1* | 8/2011 | Van Den Berg ......... A01K 1/01 119/57.92 |
| 2012/0330491 | A1 | 12/2012 | Olinger et al. |
| 2016/0154407 | A1* | 6/2016 | Litz ................... G01M 17/0074 701/23 |
| 2017/0360014 | A1* | 12/2017 | Hall .......................... A01K 5/02 |
| 2019/0155277 | A1* | 5/2019 | Ozmen ................... A47L 9/009 |

FOREIGN PATENT DOCUMENTS

| | | |
|---|---|---|
| CA | 2705973 | 6/2009 |
| CA | 2832679 | 10/2012 |
| CA | 2859954 | 8/2013 |
| CA | 2843302 | 8/2014 |
| DE | 257745 | 3/1913 |
| DE | 1803802 | 12/1969 |
| DE | 1607281 | 10/1970 |
| DE | 1782282 | 8/1971 |
| DE | 2324219 | 12/1974 |
| DE | 2942839 | 6/1988 |
| DE | 19853372 | 5/2000 |
| EP | 1779722 | 5/2007 |
| EP | 2165917 | 3/2010 |
| EP | 2284636 | 2/2011 |
| FR | 2182413 | 12/1973 |
| FR | 2448471 | 9/1980 |
| FR | 2493555 | 5/1982 |
| GB | 437037 | 10/1935 |
| GB | 495768 | 11/1938 |
| GB | 1469237 | 4/1977 |
| GB | 2069432 | 8/1981 |
| WO | 2011023860 | 3/2011 |
| WO | 2013112042 | 8/2013 |
| WO | 2014054941 | 4/2014 |
| WO | 2016018141 | 2/2016 |
| WO | 2016167649 | 10/2016 |

OTHER PUBLICATIONS

English Translation—Machine Translation of AT006016U1, published on Mar. 25, 2003.
English Translation—Machine Translation of DE257745(C), published on Mar. 18, 1913.
Translation—Machine Translation of DE1607281(A1), published on Oct. 22, 1970.
Translation—Machine Translation of DE1782282(A1), published on Aug. 12, 1971.
Translation—Machine Translation of DE1803802(A1), published on Dec. 11, 1969.
Translation—Machine Translation of DE2324219(A1), published on Dec. 5, 1974.
English Translation—Machine Translation of DE2942839(C2), "Automatically guided load handling vehicle with electric drive—has current rail running along overhead guidance track", published on Jun. 23, 1988.
English Translation—Machine Translation of DE19853372(A1), "Overhead rail guided has transverse deflection of guide carriage displaced along overhead guide rail detected for corresponding steering of steered wheels of vehicle chassis", published on May 31, 2000.
English Translation—Machine Translation of EP2165917(A2), "Guidance system", published on Mar. 24, 2010.
English Translation—Machine Translation of FR2182413(A5), published on Dec. 7, 1973.
English Translation—Machine Translation of FR2448471(A1), "Automatic steering for feed trolley—has steering rollers gripping guide rail and coupling to steering", published on Sep. 5, 1980.
English Translation—Machine Translation of FR2493555(A1), "Automatic controller for pick-up arm on trolley-bus—uses taximeter and gyroscope signals for calculator to produce position control signals", published on May 7, 1982.
English Translation—Machine Translation of WO2011023860(A2), "Method and Apparatus for Guiding a Vehicle in Respect to Overhead Line", published on Mar. 3, 2011.

* cited by examiner

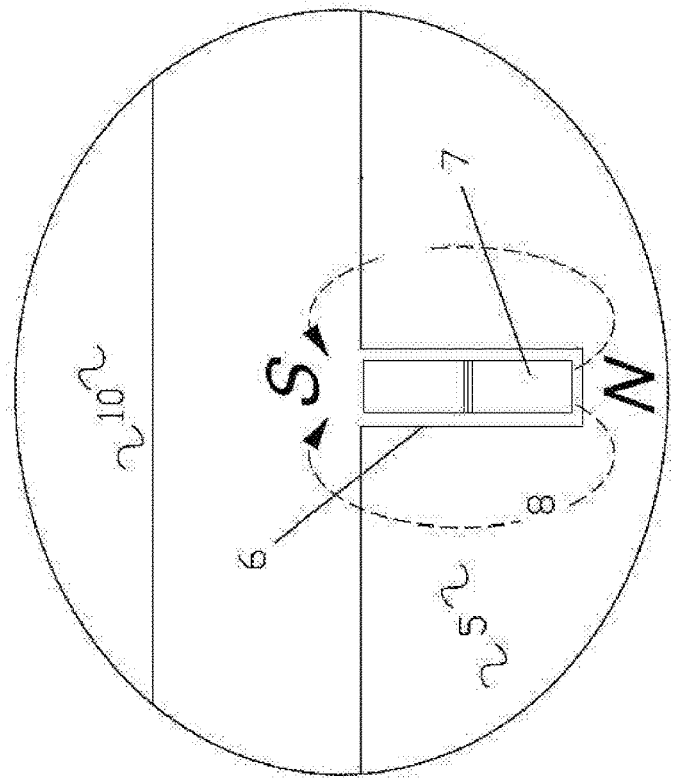
Fig. 8-A
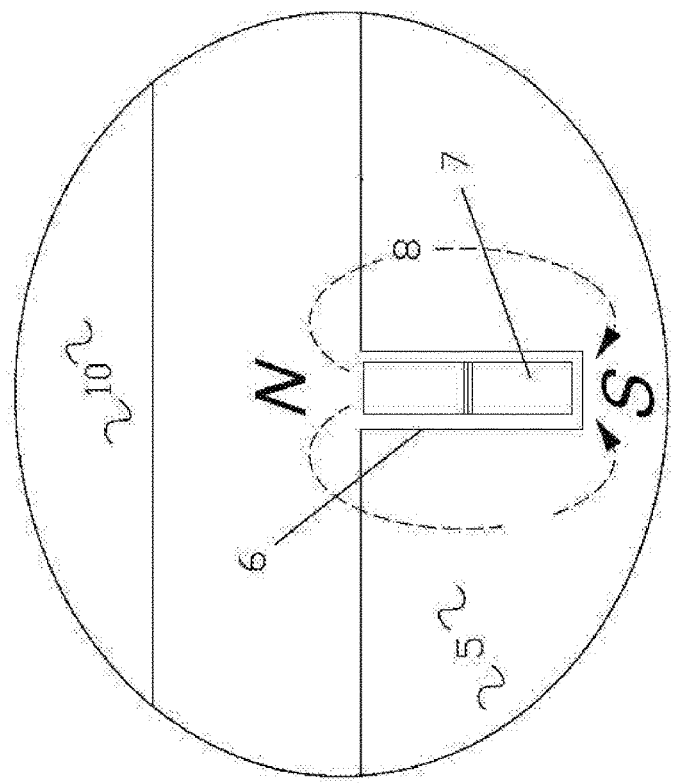
Fig. 8-B

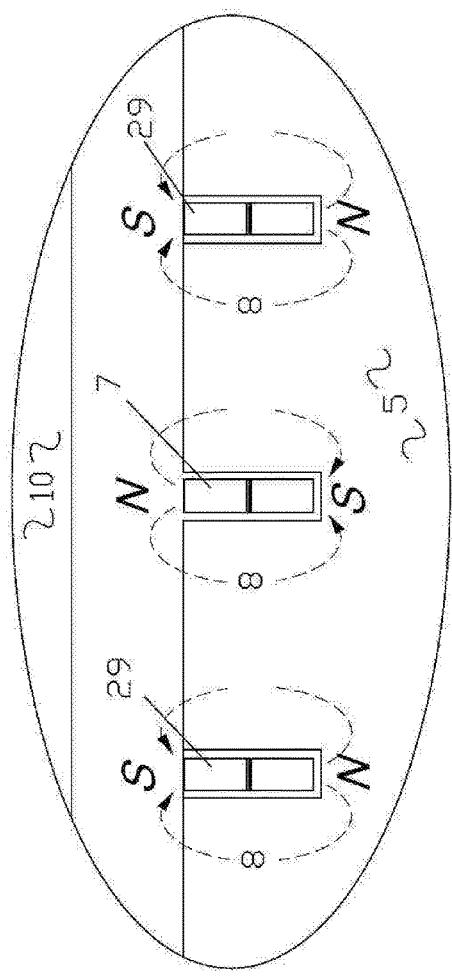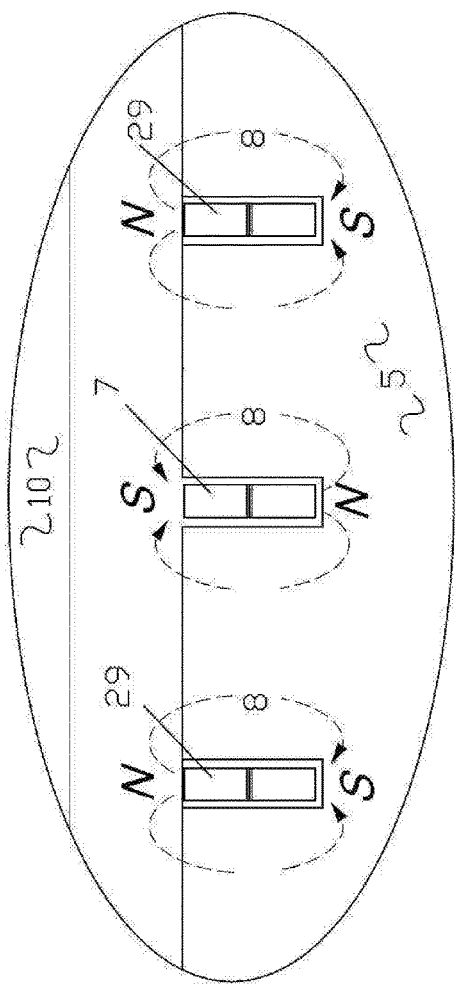
Fig. 12-A
Fig. 12-B

AUTONOMOUS VEHICLE FOR PUSHING FEED, METHODS AND SYSTEMS THEREOF

CROSS-REFERENCE TO RELATED APPLICATIONS

The present application claims the benefit of priority from U.S. provisional application No. 62/577,432 filed on Oct. 26, 2017 and Canadian patent application No. 2,983,986 filed on Oct. 26, 2017. These documents are hereby incorporated by reference in their entirety.

TECHNICAL FIELD

The present disclosure relates to autonomous equipment useful in farm management and more particularly to autonomous vehicles for pushing feed.

BACKGROUND OF THE DISCLOSURE

Unmanned autonomous vehicles for displacing animal feed are known. A drawback of such vehicles is that they often require complex navigational programming and can get lost from their path. A further drawback relates to feed pushing inefficiencies. Accordingly, there is a need for autonomous vehicles for pushing feed that follow a predetermined path without requiring complex programming, as well as a need for improved feed pushing capacities.

SUMMARY OF THE DISCLOSURE

According to one aspect, there is provided an autonomous vehicle for pushing feed lying on a floor, comprising:
  a frame;
  a skirt rotatably connected to the frame, wherein a bottom portion of the skirt continuously contacts the floor to push the feed;
  a sensor assembly mounted to the frame for detecting a magnetic field emitted from a magnetic guiding element inserted in the floor, the magnetic guiding element forming a predetermined path, and for determining a position of the vehicle relative to the magnetic guiding element; and
  a control unit mounted to the frame for directing rotation of the skirt and for guiding the vehicle along the predetermined path.

According to another aspect, there is provided an autonomous vehicle for pushing feed lying on a floor, comprising:
  a frame;
  a skirt rotatably connected to the frame, wherein a bottom portion of the skirt continuously contacts the floor to push the feed;
  a skirt drive mechanism mounted to the frame for driving rotation of the skirt,
  a sensor assembly mounted to the frame for determining a position of the vehicle along a predetermined path; and
  a control unit mounted to the frame for directing the rotation of the skirt and for guiding the vehicle along the predetermined path.

According with a further aspect, there is provided an autonomous vehicle for pushing feed lying on a floor, comprising:
  a frame;
  a prism-shaped skirt rotatably connected to the frame, wherein a bottom portion of the skirt continuously contacts the floor to push the feed;
  a sensor assembly mounted to the frame for determining a position of the vehicle along a predetermined path; and
  a control unit mounted to the frame for directing rotation of the skirt and for guiding the vehicle along the predetermined path.

In accordance with another aspect herein disclosed, there is provided a method for installing a magnetically guided autonomous vehicle for pushing feed lying on a floor, comprising:
  inserting a magnetic guiding element into a groove of a floor, the magnetic guiding element forming a predetermined path for the vehicle, wherein a north pole of the magnetic guiding element is upwardly or downwardly oriented, and wherein a top surface of the magnetic guiding element inserted into the groove is disposed evenly or below relative to a top surface of the floor; and
  detecting a magnetic field emitted by the magnetic guiding element via a sensor assembly of the vehicle.

Yet another aspect disclosed herein is a method for pushing feed lying on a floor using an autonomous vehicle, comprising:
  driving the vehicle across a predetermined path on the floor, the predetermined path being formed by a magnetic guiding element inserted within a groove of the floor;
  controlling displacement of the vehicle by:
    measuring a magnetic field emitted by the magnetic guiding element,
    determining the position of the vehicle relative to the magnetic guiding element, and
    correcting the position of the vehicle if a deviation relative to the magnetic guiding element is detected; and
  rotating a skirt of the vehicle to push the feed, wherein a bottom portion of the skirt continuously contacts the floor.

In another aspect, there is provided a system for pushing feed comprising the autonomous vehicle disclosed herein and a magnetic guiding element inserted in a floor.

In yet another aspect, there is provided a kit for pushing feed comprising the autonomous vehicle disclosed herein and a magnetic guiding element dimensioned to be inserted in a floor.

A further aspect provided herein relates to a method of manufacturing the vehicle, the system or the kit disclosed herein, said method comprising assembling constituting elements of said vehicle, system or kit by known means chosen from riveting, screwing, welding, press-fitting, clipping and gluing.

In another aspect, there is provided the use of a magnetic guiding element for guiding an autonomous vehicle for pushing feed.

In another aspect, there is provided the use of a magnetic guiding element for guiding an autonomous vehicle for pushing feed and distributing feed to animals.

In another aspect, there is provided the use of a magnetic guiding element inserted in a floor for guiding an autonomous vehicle for pushing feed and distributing feed to animals.

In another aspect, there is provided the use of a magnetic guiding element for guiding a vehicle as defined in the present application.

In another aspect, there is provided the use of a magnetic guiding element inserted in a floor for guiding the vehicle of a vehicle as defined in the present application.

In another aspect, there is provided the use of prism-shaped skirt mounted on an autonomous vehicle for pushing feed.

In another aspect, there is provided the use of a prism-shaped skirt mounted on an autonomous vehicle for pushing feed and distributing feed to animals.

BRIEF DESCRIPTION OF DRAWINGS

In the following drawings, which represent by way of example only, various embodiments of the disclosure:

FIG. 8-A is a cross-sectional view of the magnetic guiding element installed into the floor groove, with the north pole upwardly oriented. FIG. 8-B is a cross-sectional view of the magnetic guiding element installed into the floor groove, with the south pole upwardly oriented.

FIGS. 12-A and 12-B are cross-sectional views of the magnetic guiding element (in the middle) with magnetic tags on either side of the magnetic guiding element, showing a typical parking and/or charging position of the vehicle. Polarities of magnetic guiding elements and tags are inverted in FIGS. 12-A and 12-B.

DETAILED DESCRIPTION OF VARIOUS EMBODIMENTS

Figure 1:
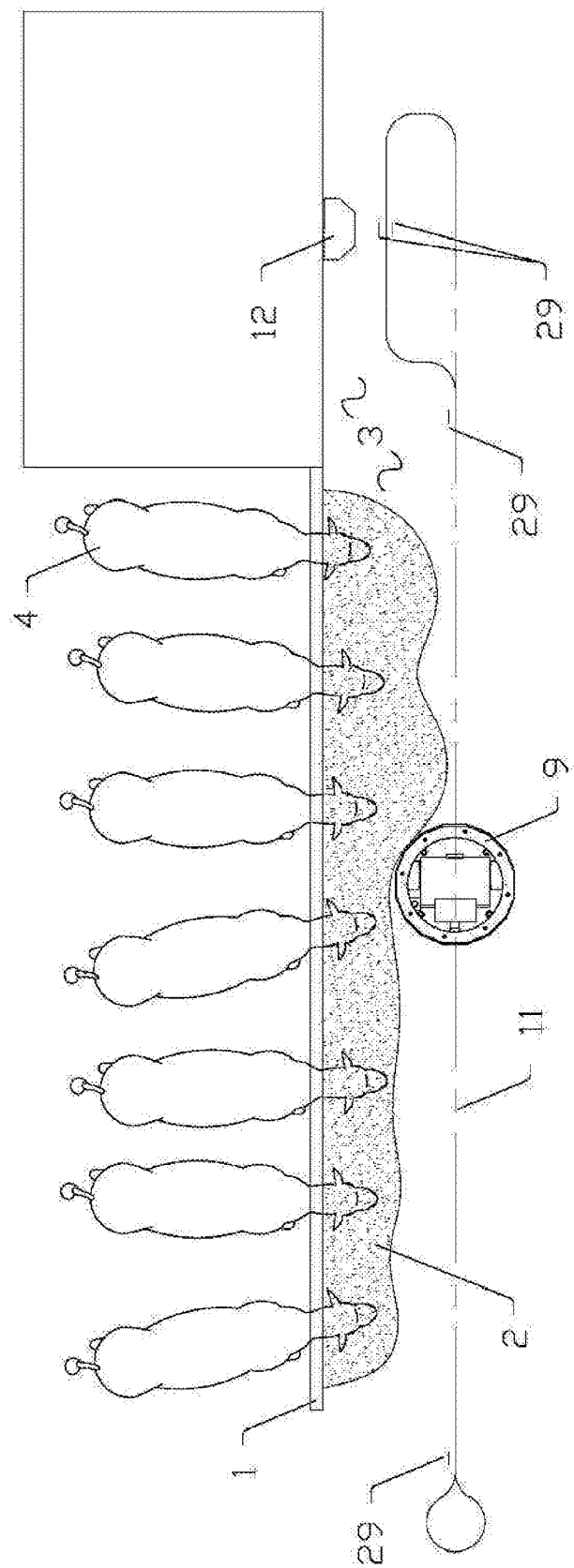
FIG. 1 is a top view of the vehicle, in accordance with an embodiment of the present disclosure. The vehicle is shown in action, distributing feed to animals, and positioned over the central axis formed by the magnetic guiding element.

Further features and advantages will become more readily apparent from the following description of various embodiments as illustrated by way of examples only and in a non-limitative manner.

As used in this specification and the appended claims, the singular forms "a", "an" and "the" include plural references unless the content clearly dictates otherwise. It should also be noted that the term "or" is generally employed in its sense including "and/or" unless the content clearly dictates otherwise.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including", "having" and their derivatives.

Finally, terms of degree such as "substantially", "about" and "approximately" as used herein mean a reasonable amount of deviation of the modified term such that the end result is not significantly changed. These terms of degree should be construed as including a deviation of ±10% of the modified term if this deviation would not negate the meaning of the word it modifies.

The term "feed" as used herein refers to any material suitable for animal consumption, for example, without limitation, hay, roughage, herbs, silage composed of vegetarian and/or mineral ingredients, grains, pellets, or mixtures thereof The definitions and embodiments described in particular sections are intended to be applicable to other embodiments herein described for which they are suitable as would be understood by a person skilled in the art.

According to one aspect, there is provided an autonomous vehicle for pushing feed lying on a floor, comprising:
  a frame;
  a skirt rotatably connected to the frame, wherein a bottom portion of the skirt continuously contacts the floor to push the feed;
  a sensor assembly mounted to the frame for detecting a magnetic field emitted from a magnetic guiding element inserted in the floor, the magnetic guiding element forming a predetermined path, and for determining a position of the vehicle relative to the magnetic guiding element; and
  a control unit mounted to the frame for directing rotation of the skirt and for guiding the vehicle along the predetermined path.

According to another aspect, there is provided an autonomous vehicle for pushing feed lying on a floor, comprising:
  a frame;
  a skirt rotatably connected to the frame, wherein a bottom portion of the skirt continuously contacts the floor to push the feed;
  a skirt drive mechanism mounted to the frame for driving rotation of the skirt,
  a sensor assembly mounted to the frame for determining a position of the vehicle along a predetermined path; and
  a control unit mounted to the frame for directing the rotation of the skirt and for guiding the vehicle along the predetermined path.

According with a further aspect, there is provided an autonomous vehicle for pushing feed lying on a floor, comprising:
  a frame;
  a prism-shaped skirt rotatably connected to the frame, wherein a bottom portion of the skirt continuously contacts the floor to push the feed;

a sensor assembly mounted to the frame for determining a position of the vehicle along a predetermined path; and a control unit mounted to the frame for directing rotation of the skirt and for guiding the vehicle along the predetermined path.

For example, the skirt connected to the frame is freely translatable in a vertical direction relative to the frame to allow continuous contact with the floor.

For example, the height of the skirt relative to the frame is self-adjustable to allow continuous contact with the floor.

For example, the skirt is tilted towards a front portion of the vehicle such that the bottom portion of the skirt continuously contacts the floor at the front portion of the vehicle. For example, the skirt is forwardly tilted.

For example, the skirt is tilted towards a front portion of the vehicle and towards a direction of movement of the vehicle along the predetermined path such that the bottom portion of the skirt continuously contacts the floor at the front portion of the vehicle and towards the direction of movement along the predetermined path.

For example, the skirt is tilted towards a direction of movement of the vehicle along the predetermined path such that the bottom portion of the skirt continuously contacts the floor towards the direction of movement.

For example, the skirt is at an angle α of about 0° to about 10° with respect to an axis defined by the floor.

For example, the skirt is tilted at an angle α of about 0.1° to about 10° with respect to an axis defined by the floor.

For example, the skirt is tilted at an angle α of about 0.5° to about 5° with respect to an axis defined by the floor.

For example, the skirt is tilted at an angle α of about 1° to about 5° with respect to an axis defined by the floor.

For example, the skirt is tilted at an angle β of about 0.1° to about 10° with respect to an axis perpendicular to the floor.

For example, the skirt is tilted at an angle β of about 0.5° to about 5° with respect to an axis perpendicular to the floor.

For example, the skirt is tilted at an angle β of about 1° to about 5° with respect to an axis perpendicular to the floor.

For example, the skirt is at an angle β of about 0° to about 10° with respect to an axis perpendicular to the floor.

For example, the bottom portion of the skirt continuously contacts the floor at the front portion of the vehicle adjacent to the magnetic guiding element.

For example, the skirt is connected to the frame via a skirt carrier, the skirt carrier being secured to the frame and the skirt being freely translatable in a vertical direction with respect to the skirt carrier.

For example, the skirt carrier comprises a plurality of pins extending upwardly therefrom, for inserting into a corresponding plurality of skirt holes of the skirt and for mounting the skirt to the skirt carrier.

For example, the skirt carrier is an annular member rotatably mounted on said frame and comprising a plurality of pins extending upwardly therefrom, for inserting into a corresponding plurality of skirt holes of the skirt and for mounting the skirt to the skirt carrier.

For example, the vehicle further comprises a skirt drive mechanism mounted to the frame for driving rotation of the skirt.

For example, the vehicle further comprises a corresponding plurality of springs inserted in the plurality of pins between the skirt carrier and skirt.

For example, the sensor assembly is configured to detect a magnetic field emitted from a magnetic guiding element inserted in the floor, the magnetic guiding element forming the predetermined path, and for determining a position of the vehicle relative to the magnetic guiding element.

For example, when the vehicle deviates from the predetermined path such that a shift in the magnetic field position relative to a predetermined portion of the sensor (for example the central portion of the sensor) is detected by the sensor assembly, the control unit instructs the vehicle to reposition itself along the predetermined path.

For example, when the vehicle deviates from the predetermined path such that the magnetic field is no longer detected by the sensor assembly, the control unit instructs the vehicle to stop moving.

For example, the sensor assembly comprises a plurality of sensors such as Hall Effect sensors.

For example, the sensor assembly is configured to detect a magnetic field emitted from a magnetic tag inserted in the floor, and in response the control unit is configured to instruct the vehicle to change rotation direction of the skirt and/or displacement velocity.

For example, the magnetic tag has a polarity opposite to that of the magnetic guiding element.

For example, the vehicle further comprises a skirt drive mechanism mounted to the frame for driving rotation of the skirt.

For example, the vehicle further comprises a skirt carrier driven by the skirt drive mechanism, the skirt carrier configured to support the skirt and drive the rotation thereof.

For example, the skirt carrier comprises a plurality of pins extending upwardly therefrom, for inserting into a corresponding plurality of skirt holes of the skirt and for mounting the skirt to the skirt carrier.

For example, the vehicle further comprised a corresponding plurality of springs inserted in the plurality of pins between the skirt carrier and skirt.

For example, the skirt is prism-shaped.

For example, the skirt has a shape of a triangular prism, a tetragonal prism, a pentagonal prism, a hexagonal prism, a heptagonal prism, an octagonal prism, an enneagonal prism, a decagonal prism, a hendecagonal prism, a dodecagonal prism, a tridecagonal prism, a tetradecagonal prism, a pentadecagonal prism, a hexadecagonal prism, a heptadecagonal prism, an octadecagonal prism, an enneadecagonal prism or an icosagonal prism.

For example, the skirt has a shape of a hexagonal prism, a heptagonal prism, an octagonal prism, an enneagonal prism, a decagonal prism, a hendecagonal prism, a dodecagonal prism, a tridecagonal prism, a tetradecagonal prism, a pentadecagonal prism, a hexadecagonal prism, a heptadecagonal prism, an octadecagonal prism, an enneadecagonal prism or an icosagonal prism.

For example, the predetermined path is a closed loop.

For example, the feed is pushed toward a feeding fence and/or animals to be fed.

In accordance with another aspect herein disclosed, there is provided a method for installing a magnetically guided autonomous vehicle for pushing feed lying on a floor, comprising:

inserting a magnetic guiding element into a groove of a floor, the magnetic guiding element forming a predetermined path for the vehicle, wherein a north pole of the magnetic guiding element is upwardly or downwardly oriented, and wherein a top surface of the magnetic guiding element inserted into the groove is disposed evenly or below relative to a top surface of the floor; and detecting a magnetic field emitted by the magnetic guiding element via a sensor assembly of the vehicle.

For example, the method further comprises forming the groove in the floor prior to inserting the magnetic guiding element therein.

For example, the groove is formed using a saw.

For example, the magnetic guiding element is press fitted into the groove of the floor.

For example, the magnetic guiding element is a rectangular prism comprising a pair of rectangular bases, a pair of narrower faces and a pair of broader faces, and one of the narrower faces forms the top surface of the magnetic guiding element.

For example, each narrower face has a length of about 1 mm to about 10 mm.

For example, each narrower face has a length of about 1 mm to about 6 mm.

For example, each narrower face has a length of about 1 mm to about 5 mm.

For example, each narrower face has a length of about 2 mm to about 5 mm.

For example, each narrower face has a length of about 3 mm to about 6 mm.

For example, the narrower face to broader face length ratio is about 1:8 to about 1:2.

For example, a top surface of the magnetic guiding element inserted into the groove can be disposed evenly or below relative to a top surface of the floor.

For example, a top surface of the magnetic guiding element inserted into the groove can be disposed up to 20 mm below the top surface of the floor.

For example, a top surface of the magnetic guiding element inserted into the groove can be disposed about 1 mm to about 20 mm below the top surface of the floor.

For example, a top surface of the magnetic guiding element inserted into the groove can be disposed about 1 mm to about 10 mm below the top surface of the floor.

For example, the method further comprises positioning the vehicle over the magnetic guiding element.

For example, the method further comprises inserting a magnetic tag in a second groove of the floor, wherein the magnetic tag provides instructions to the vehicle to change rotation direction and/or displacement velocity.

Yet another aspect disclosed herein is a method for pushing feed lying on a floor using an autonomous vehicle, comprising:

driving the vehicle across a predetermined path on the floor, the predetermined path being formed by a magnetic guiding element inserted within a groove of the floor;

controlling displacement of the vehicle by:
  measuring a magnetic field emitted by the magnetic guiding element,
  determining the position of the vehicle relative to the magnetic guiding element, and
  correcting the position of the vehicle if a deviation relative to the magnetic guiding element is detected; and rotating a skirt of the vehicle to push the feed, wherein a bottom portion of the skirt continuously contacts the floor.

For example, when the vehicle deviates from the predetermined path such that a shift in the magnetic field position relative to a predetermined portion of the sensor assembly is detected, the vehicle repositions itself along the predetermined path.

For example, the vehicle deviates from the predetermined path such that the magnetic field is no longer detected, the vehicle stops moving.

For example, the feed is pushed toward a feeding fence and/or animals to be fed.

In another aspect, there is provided a system for pushing feed comprising the autonomous vehicle disclosed herein and a magnetic guiding element inserted in a floor.

For example, the system further comprises a charging station for recharging the vehicle.

In yet another aspect, there is provided a kit for pushing feed comprising the autonomous vehicle disclosed herein and a magnetic guiding element dimensioned to be inserted in a floor.

For example, the kit further comprises a charging station for recharging the vehicle.

Accordingly, it is herein described an autonomous vehicle for pushing feed lying on a floor. The vehicle follows a predetermined path which serves as a guide for the vehicle. The vehicle 9, shown in action in FIG. 1, distributes feed 2 to animals 4 and is positioned over a central axis 11 formed by a magnetic guiding element. The animals 4 are behind a feeding fence 1 and the feed 2 is pushed towards the feeding alley 3 where the animals can reach the feed. As further described herein, the distribution of feed is carried out by advancing the feed along the central axis and rotating the vehicle's skirt in a predetermined orientation to push the feed towards the animals.

Figure 2:
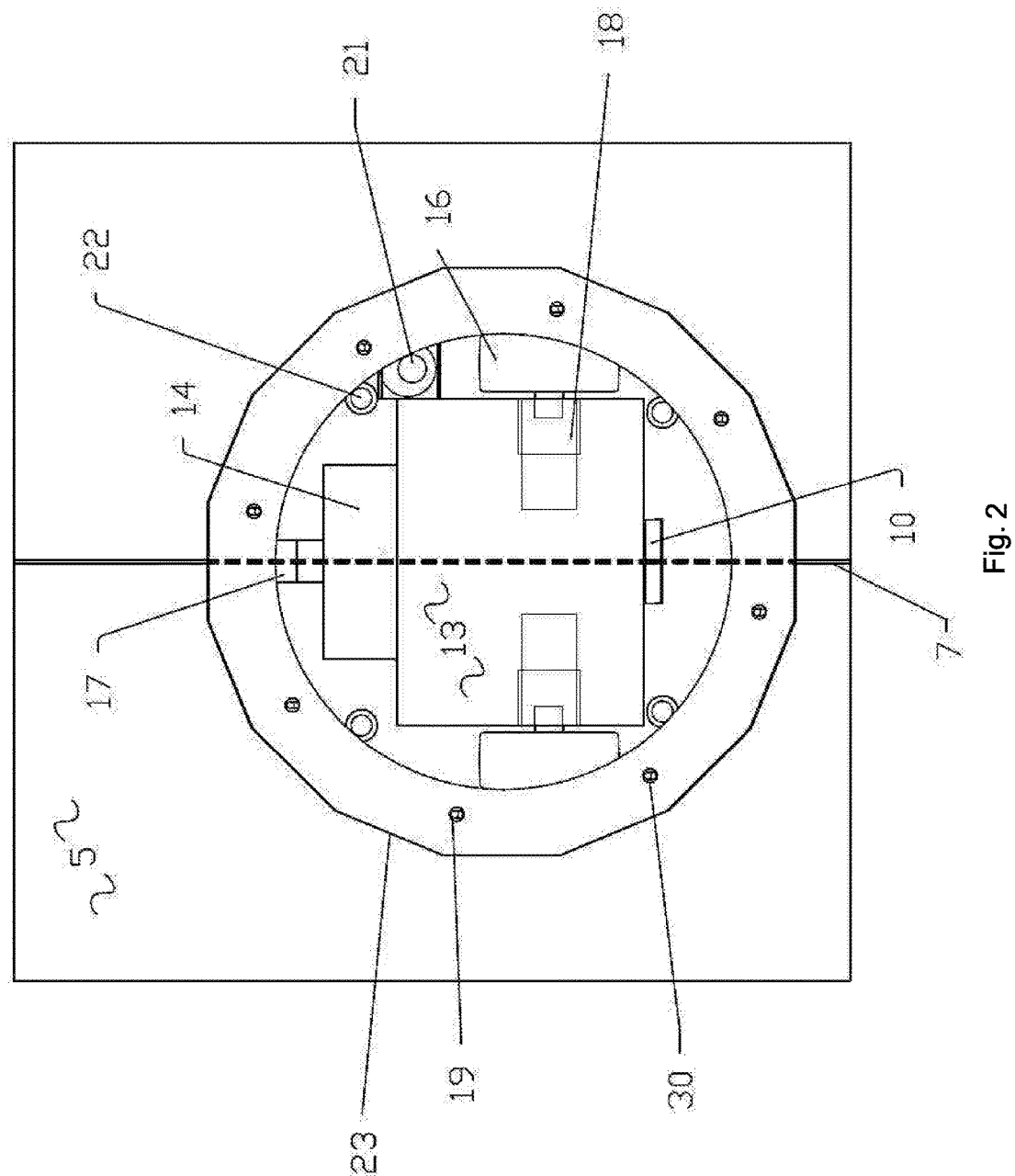
FIG. 2 is a top plan view of the vehicle.

Referring now to FIG. 2, the vehicle 9 comprises two drivable wheels 16 and an electrical drive motor 18 to move along the predetermined path formed by the magnetic guiding element 7. In some embodiments, the vehicle 9 further comprises a support wheel 17, for example a rear swivel wheel to provide the vehicle 9 a third support point. The wheels are connected to the vehicle frame 15. As shown in FIG. 2, the frame further supports a battery system 13 which supplies energy to the vehicle.

The autonomous vehicle 9 is used to push feed 2. The feed referred to herein includes any material suitable for animal consumption, for example, without limitation, hay, roughage, herbs, silage composed of vegetarian and mineral ingredients, grains, pellets that is to be moved laterally by the vehicle.

The vehicle 9 comprises several desirable features further described herein. Firstly, it comprises a sensor assembly 10 which detects a magnetic guiding element 7 that is integrated in the floor 5 on which the vehicle navigates. Secondly, the vehicle 9 comprises a skirt 20 that has a flexible strip 24 at its bottom that serves to sweep the floor along with any feed lying on the floor. The bottom edge 25 of the flexible skirt portion 24 continuously contacts the floor 5. Thirdly, the skirt 20 has a prismatic shape which allows for increased efficiency in the lateral displacement of the feed 2.

Figure 6:
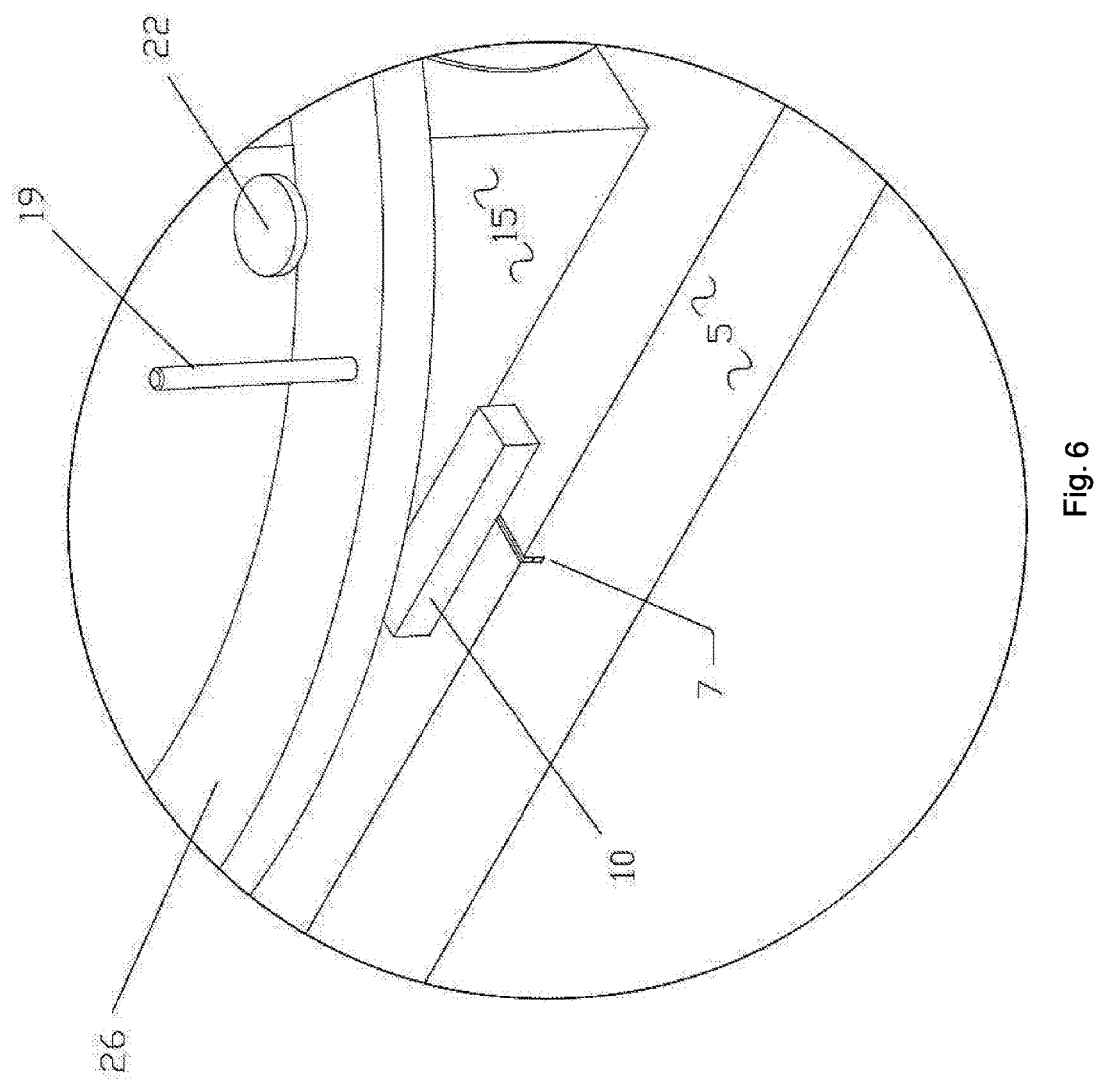
FIG. 6 is a close-up view of the sensor assembly located over the central axis formed by the magnetic guiding element.
Figure 10:
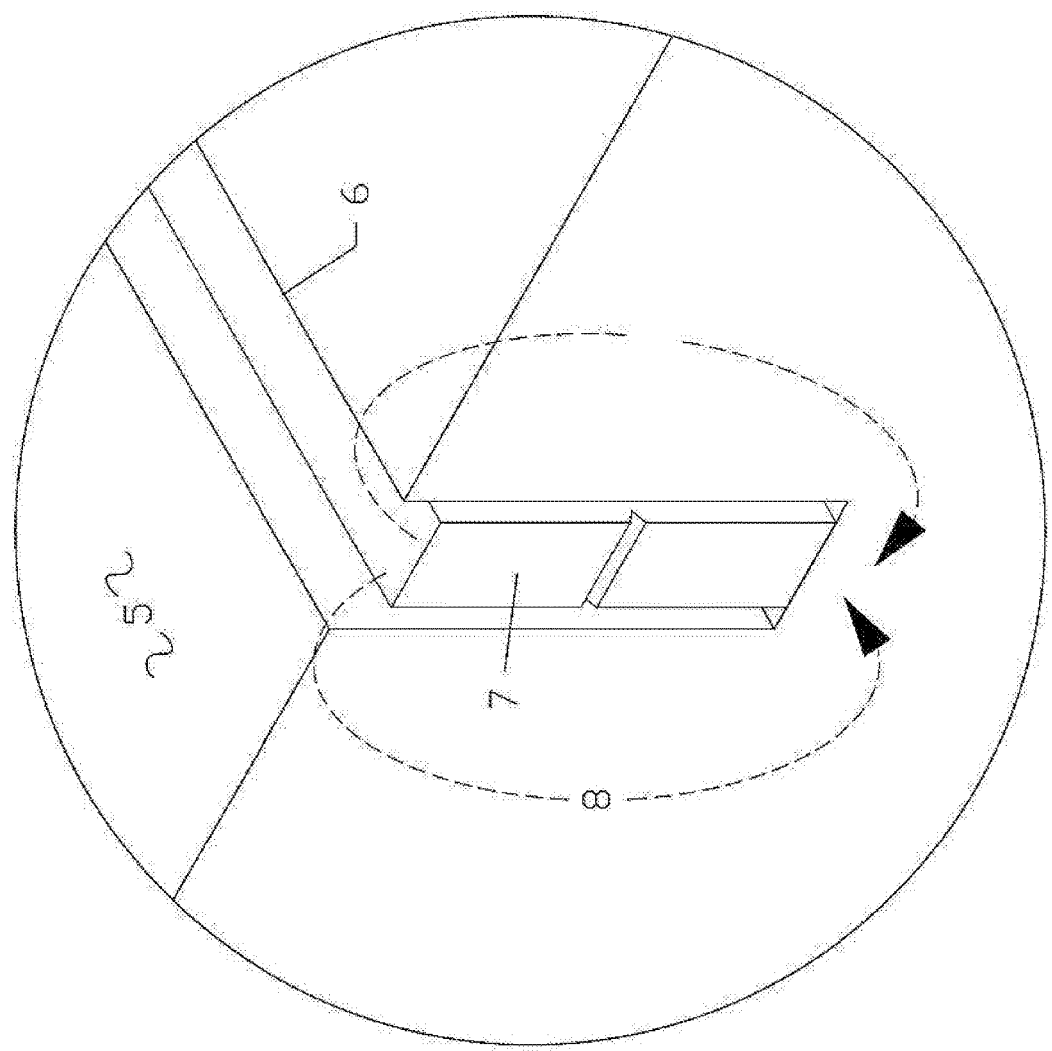
FIG. 10 is a cross-sectional view of the magnetic guiding element installed into the floor groove.

As mentioned above, the magnetic guiding element 7 forms a predetermined path on which the vehicle 9 navigates. This predetermined path formed by the magnetic guiding element 7 is shown for example in FIGS. 2 to 5. The magnetic guiding element 7 is for example a magnetic strip of a certain length. Several magnetic strips may be combined together to form the magnetic guiding element. For example, as illustrated in FIGS. 6 and 10, the magnetic guiding element is a rectangular prism comprising a pair of rectangular bases, a pair of narrower faces and a pair of broader faces. The magnetic guiding element 7 comprises a north pole and a south pole. Referring to FIGS. 8-A and 8-B, the magnetization of the magnetic guiding element 7 is made on the surface of the narrower faces. This "through the width" magnetization orientation is different from that of other standard magnetic strips. Although it may emit a narrower magnetic field than standard magnetic strips, it provides greater accuracy and ease of installation given it is thinner. For example, a thin groove 6 can be formed in the floor 5, in which the magnetic guiding element 7 can be readily inserted (preferably press fitted), and easily removed if necessary.

Installation of the magnetic guiding element 7 can be done after installation of the infrastructure and floor, thus eliminating significant installation costs at the time of floor installation. The predetermined path formed by the magnetic guiding element can be modified easily for example by adding or removing a circuit, by modifying the circuit, etc . . . .

Figure 7:
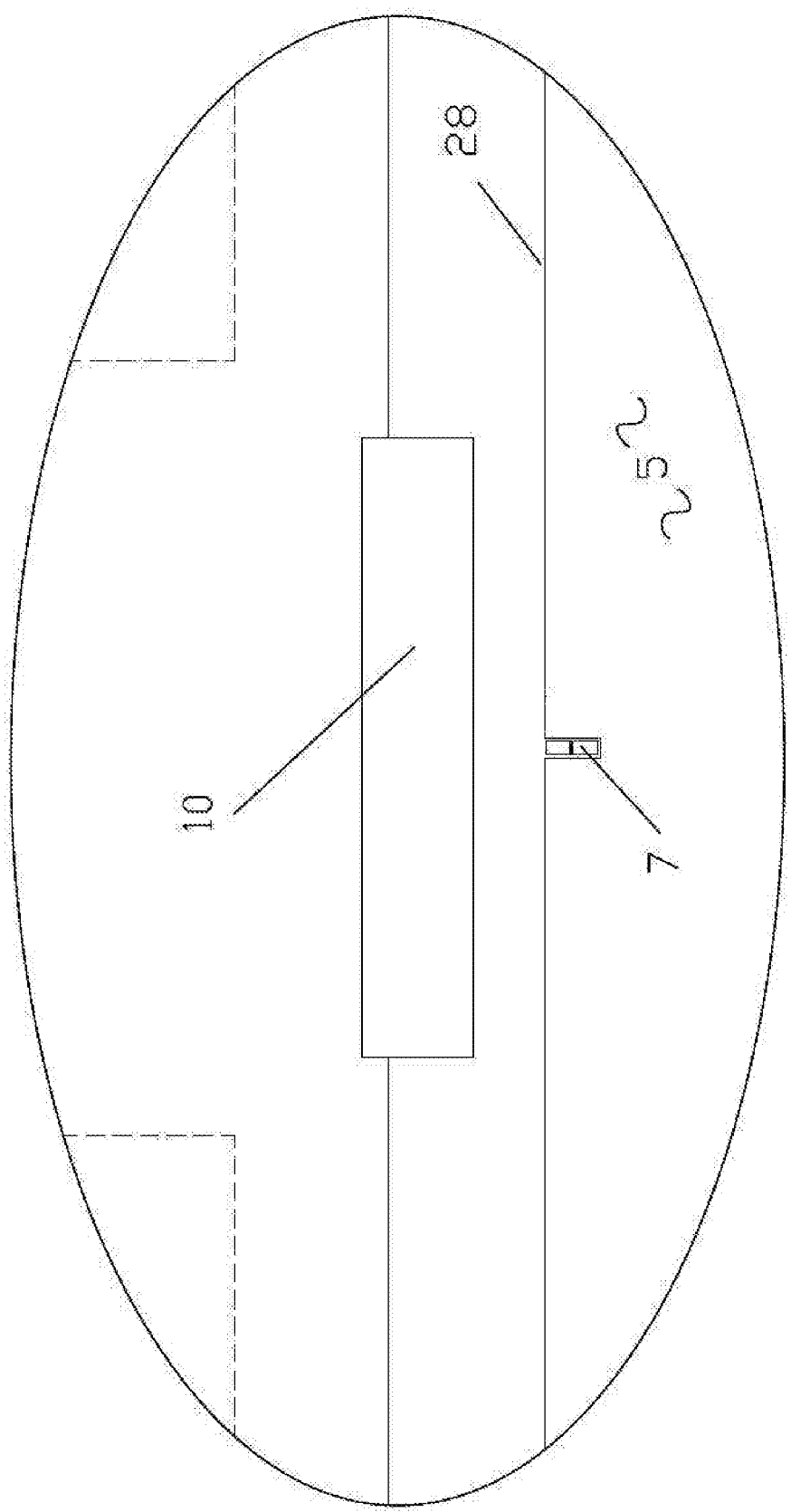
FIG. 7 is a close-up front view of the sensor assembly located over the magnetic guiding element.

The magnetic guiding element 7 can be inserted into the floor 5 using several techniques so long as its top surface is disposed evenly or below relative to the top surface of the floor (see for example FIGS. 7 and 9. Referring to FIGS. 7 and 10, a groove 6 in the floor 5 allows for easy insertion of the magnetic guiding element 7. In addition, the magnetic guiding element 7 can be press fitted into the groove 6 such that it fills all the gaps therein, allowing the magnetic guiding element 7 to provide a flat and smooth surface on the floor. This is advantageous over other configurations in which the magnetic strip, magnetized on its broader faces, is placed on the floor instead of in the floor. This would not be appropriate for the vehicle herein described whose navigation path is determined by the magnetic guiding element 7 such that the bottom portion of the skirt 25 continuously contacting the floor would also continuously contact the magnetic guiding element 7. A magnetic guiding element disposed on, instead of in the floor, would prevent the floor surface from remaining clean and would prevent the feed 2 from being properly and entirely pushed.

The polarity of the magnetic guiding element 8 is not critical when installing the magnetic guiding element in the groove 6 of the floor 5. The polarity however should be maintained throughout the length of the circuit or predetermined path when magnetic strips used to form the magnetic guiding element 7 are installed in series.

Referring now to FIG. 10, the sensor assembly 10 continuously detects the magnetic field 8 emitted from the magnetic guiding element 7. The magnetic guiding element 7 must be located under the sensor assembly 10 for the vehicle 9 to be properly guided. For example, the sensor assembly is positioned directly over the magnetic guiding element 7, as shown in FIG. 6. The sensor assembly 10 detects the magnetic field 8 and acquires a relative position of the magnetic guiding element 7 with respect to the vehicle 9. The position coordinates are then sent to a control unit 14 mounted to the frame 15 of the vehicle 9. The control unit 14 contains navigation algorithms which use the position of the magnetic guiding element 7 and sensor assembly 10 to perform guidance of the vehicle 9. A deviation from the central axis 11 formed by the magnetic guiding element (as illustrated in FIGS. 1 to 5) causes the control unit 14 to react to the deviation data and to modify the direction of the vehicle 9 by repositioning the vehicle in order to re-center the sensor assembly 10 above the magnetic guiding element 7.

The direction of the vehicle 9 is changed by an electrical drive motor 18. In case the vehicle 9 cannot maintain the direction, for example if it is pushed out of its trajectory by an external event, the sensor assembly 10 consequently no longer detects the magnetic guiding element 7 thereunder because the magnetic field 8 emitted by the magnetic guiding element 7 is no longer within a detectable range of the sensor assembly 10. The sensor assembly 10 thus loses the signal and stops sending instructions to the control unit 14. In this case, the control unit 14 stops the vehicle 9. This principle of operation is safer than other known means of operation because the vehicle 9 cannot leave the central axis 11 formed by the magnetic guiding element 7 beyond an acceptable deviation distance.

The circuit (or predetermined path) of the vehicle 9 is made up of one or more magnetic guiding elements 7. These magnets, e.g. magnetic strips, are installed in series in order to form the predetermined path for the vehicle 9 to follow. For example, as shown in FIG. 1, magnetic guiding elements 7 are installed end to end to form a closed loop circuit so that the vehicle 9 cannot leave the path determined by the user during the installation of the magnetic guiding element 7 and further cannot get "lost" in its programming.

Although the circuit shown in FIG. 1 is composed of two loops forming a closed circuit, the magnetic guiding element 7 may be configured to form different types of circuits e.g. with different branches, that the vehicle can follow, according to the user's needs. These circuits may be timer programmed so that the vehicle follows different paths throughout the day.

Figure 11:
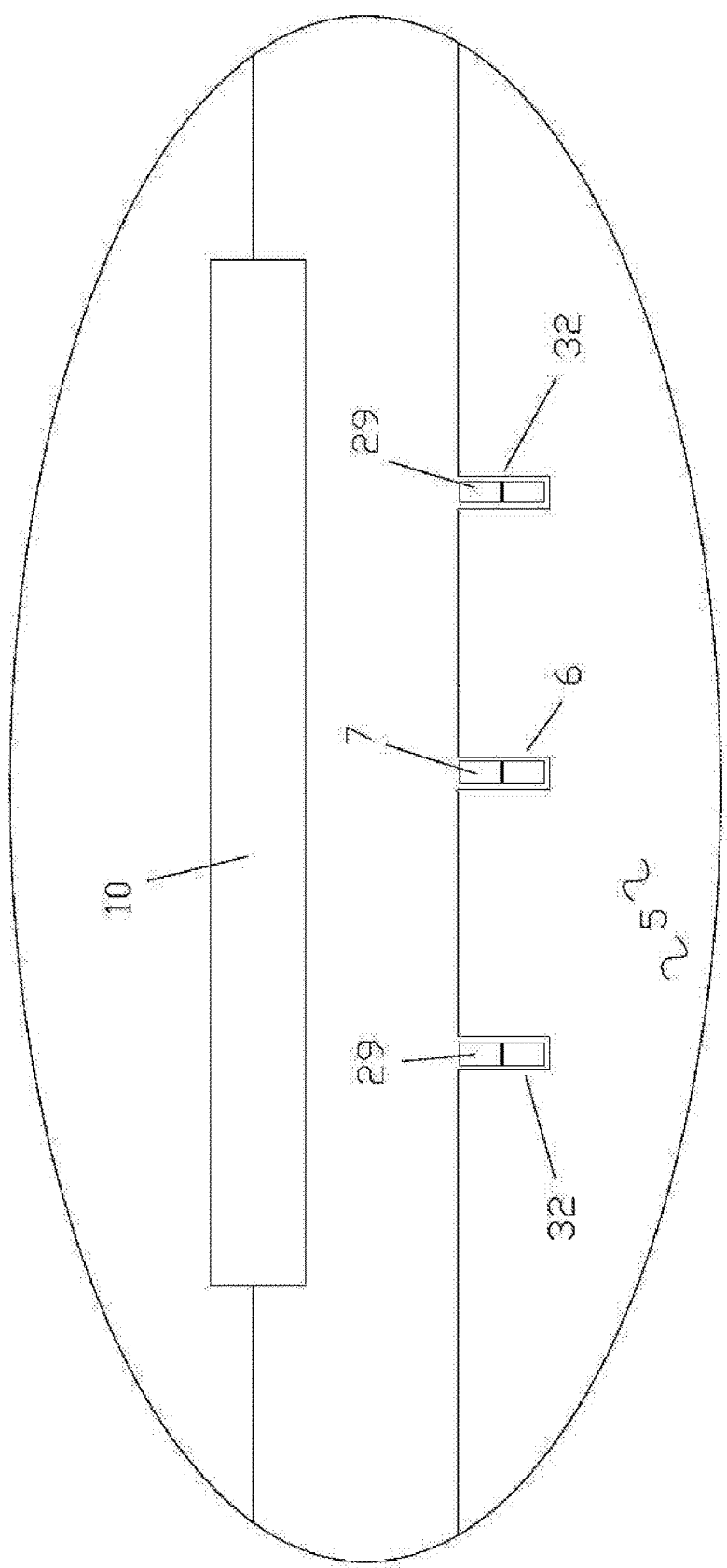
FIG. 11 is a front view of the sensor assembly located over the magnetic guiding element and magnetic tags on either side of the magnetic guiding element, illustrating a typical parking and/or charging position of the vehicle.
Figure 13:
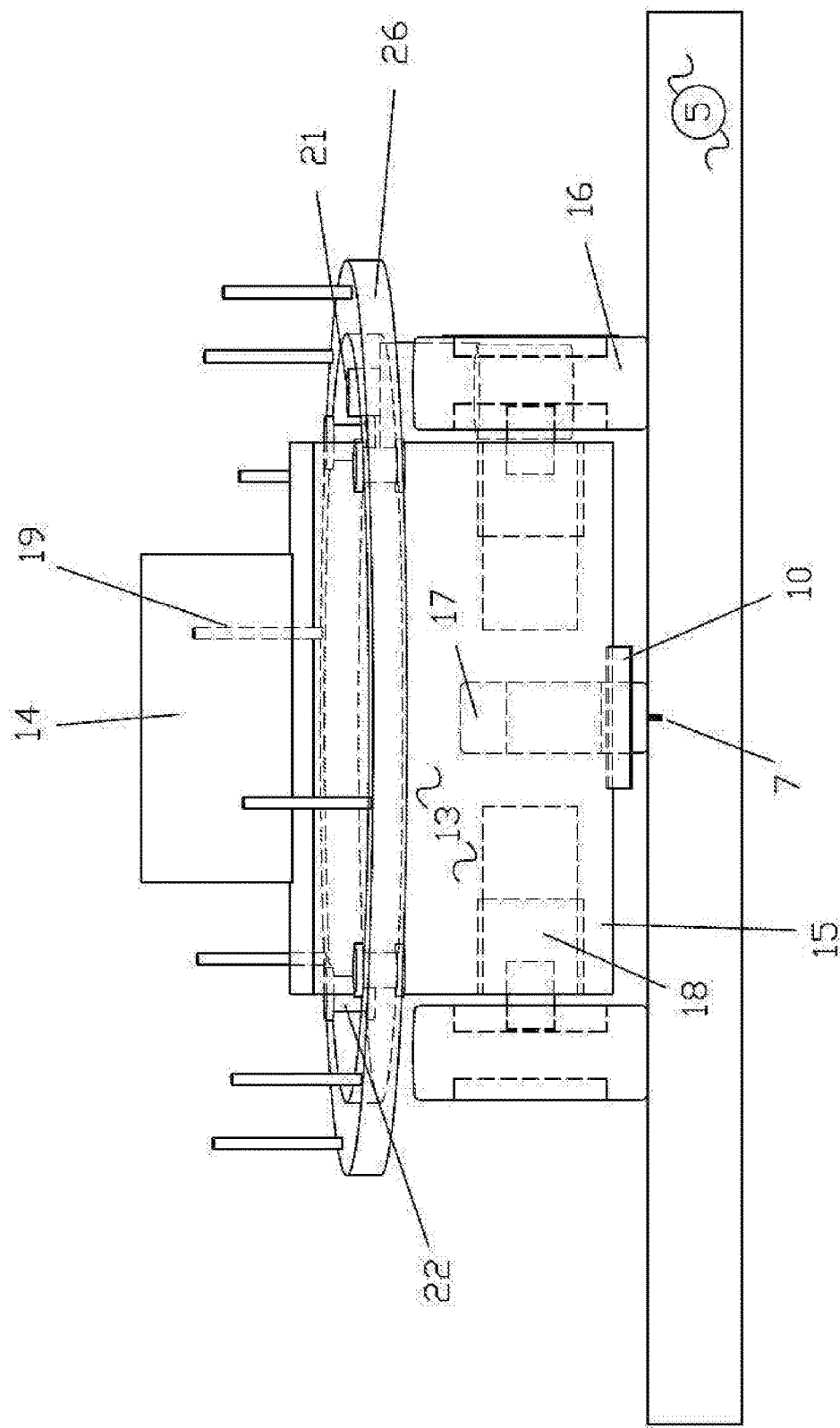
FIG. 13 is a front view of the vehicle without its skirt.
Figure 14:
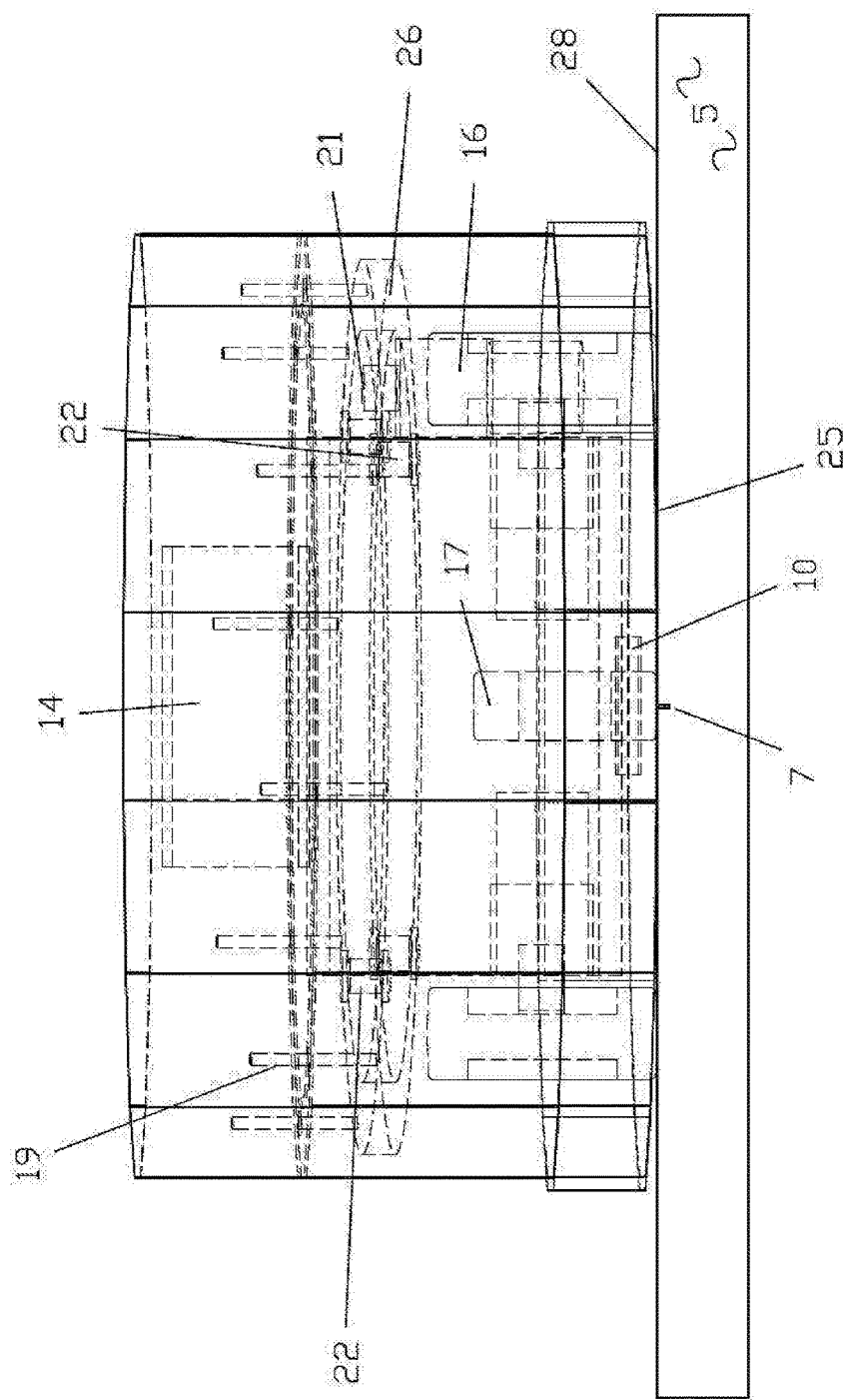
FIG. 14 is a front view of the vehicle.

In certain embodiments, as shown in FIGS. 1, 11, 12-A and 12-B, magnetic tags 29 are disposed along the path to indicate different functions and commands for the control unit 14 such as for example position, charging station 12, direction of rotation of the skirt 20. These tags 29 are formed for example using short magnetic strips, for example the same strips as those used to form the magnetic guiding element. These strips are cut to a predetermined length and placed on each side of the predetermined path. The magnetic tags 29 are also inserted into a groove 32 in the floor so as to not impede the operation of the vehicle.

Referring to FIGS. 12-A and 12-B, a magnetic tag 29 is installed in the floor 5 on either side and parallel to the magnetic guiding element 7. These magnetic tags 29 can have a various length, for example 100 mm, and can be installed in polarity opposite to that of the magnetic guide element 7. Upon detecting a change in magnetic field, the control unit 14 can provide various instructions to the vehicle. For example, and referring back to FIG. 1, a magnetic tag 29 positioned to the right of the magnetic guiding element 7 is a signal for clockwise rotation of the skirt; a magnetic tag 29 positioned to the left of the magnetic guiding element 7 is a signal for counter clockwise rotation of the skirt; and a magnetic tag 29 positioned on both left and right side of the magnetic guiding element 7 is a signal for charging or parking position.

Accordingly, this configuration is less complex and more reliable than other similar vehicles as there is no requirement for special circuit programming. The control unit 14 follows the trajectory of the magnetic guiding element 7 including its branch lines, curves, magnetic tags, as well as straight lines, and the (parking and/or support) stops without intervention or change from external programming. At any time the vehicle 9 "knows" if it is positioned on the path because it is guided by the magnetic guiding element and if the vehicle moves out of the predetermined path, it will automatically stop, and will fall in alarm mode.

Now referring to FIGS. 12-A and 12-B, the polarity of the magnetic tags 29 is opposite of that of the magnetic guiding element 7. This causes changes in the magnetic field 8 measured by the sensor assembly 10. The sensor assembly 10 detects this change and sends such information to the control unit 14. The control unit 14, using its algorithms, perform the various actions programmed according to the type of magnetic tag 29 detected during the operation of the vehicle 9.

Figure 9:
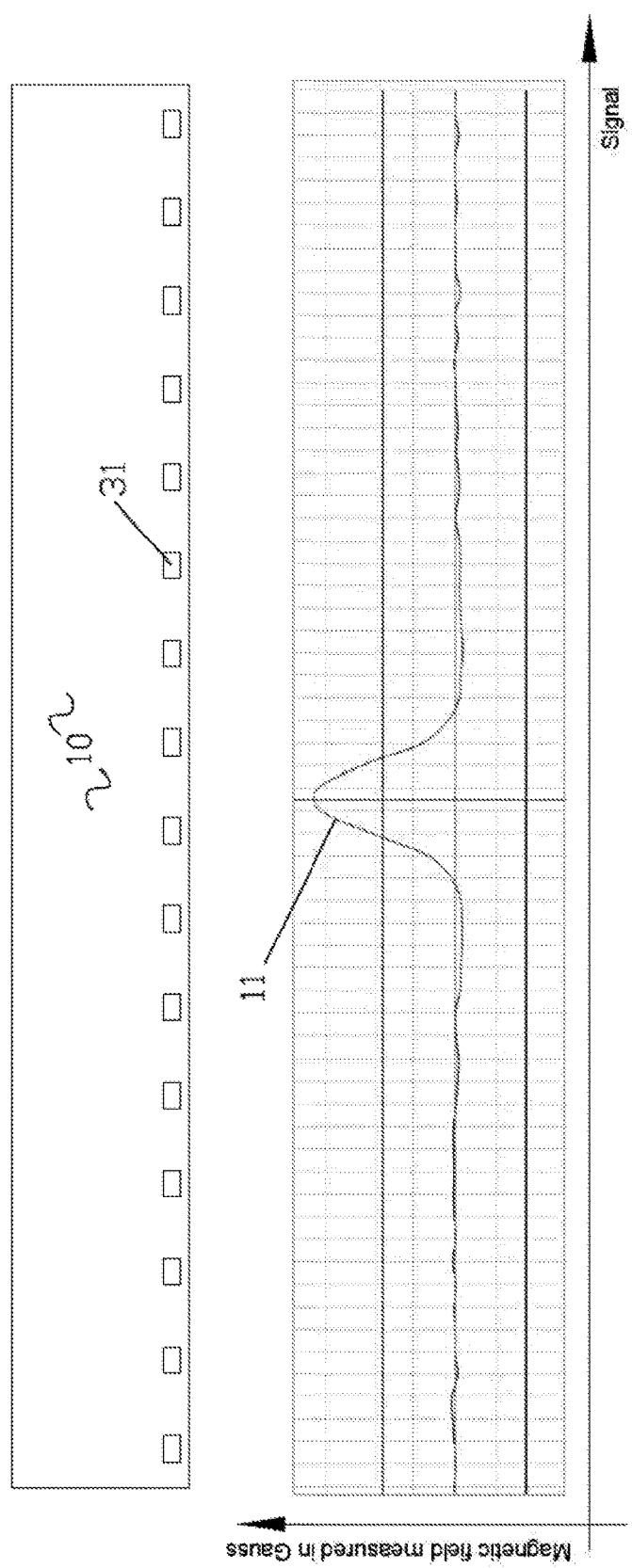
FIG. 9 is a schematic showing individual sensors on the sensor assembly and a signal graph below illustrating the strength of detected magnetic signals relative to the central axis formed by the magnetic guiding element.

Referring specifically now to FIG. 9, in certain embodiments, the sensor assembly 10 is formed of multiple sensors 31, for example Hall Effects sensors positioned on the same line and which detect the magnitude of the magnetic field. Each sensor 31 performed a single capture and sends the information to the control unit 14. The control unit 14 creates, as shown in FIG. 9, a chart of the sensor readings to provide an illustration of the magnetic field. The sensor line formed by the sensors 31 is perpendicular to the magnetic guiding element 7 so that when the vehicle 9 deviates from the predetermined path, the sensor assembly 10 detects a change in magnetic field equivalent to the change in position. When the magnetic field exceeds a certain level, the peak of the signal strength (top curve) determines the central axis 11 formed by the magnetic guiding element 7, allowing the vehicle to move according to the control unit 14. For example, the graph of FIG. 9 indicates that the sensor assembly is directly positioned on the central axis 11 of the predetermined path.

Figure 3:
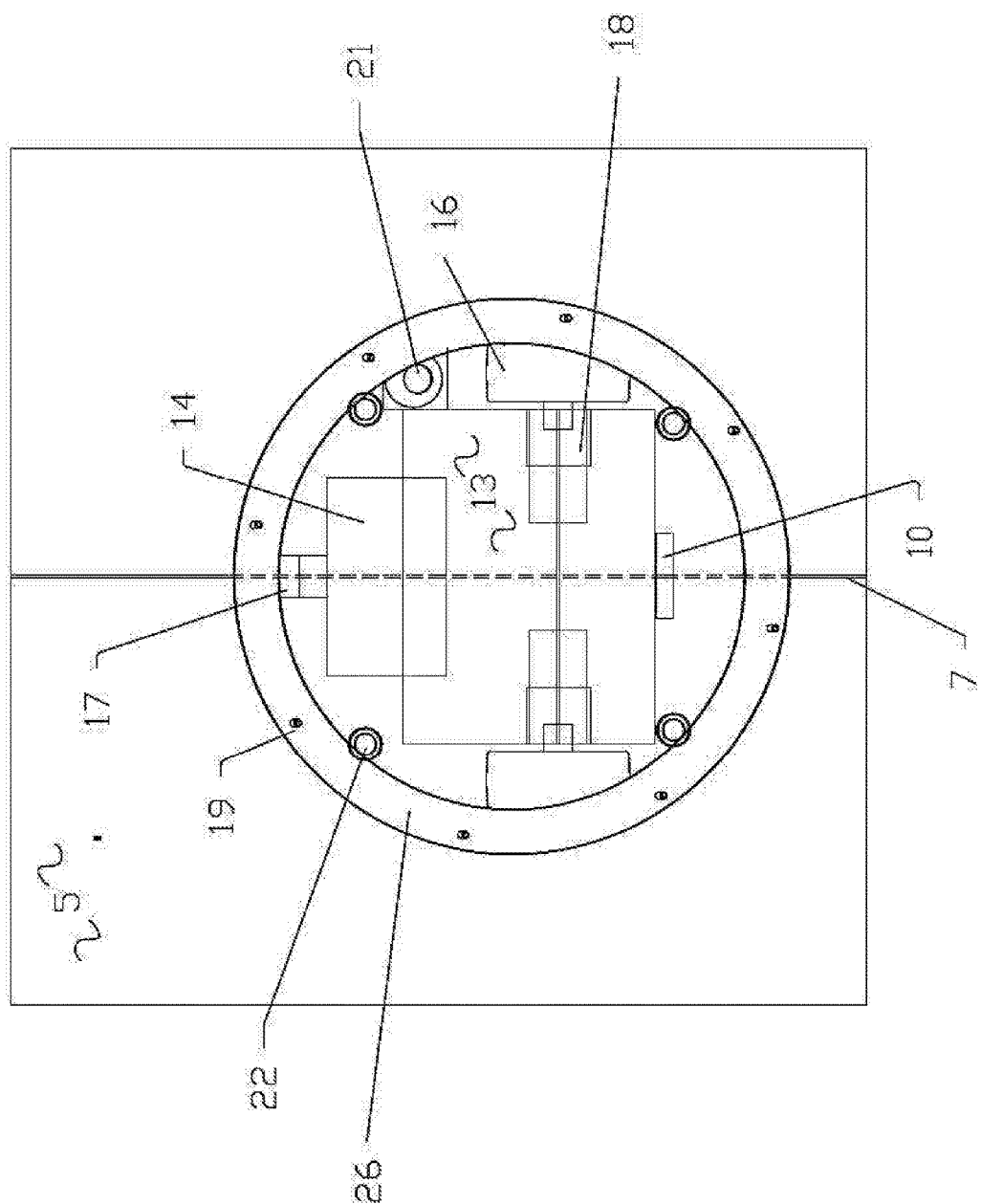
FIG. 3 is a top plan view showing vehicle without its skirt.
Figure 4:
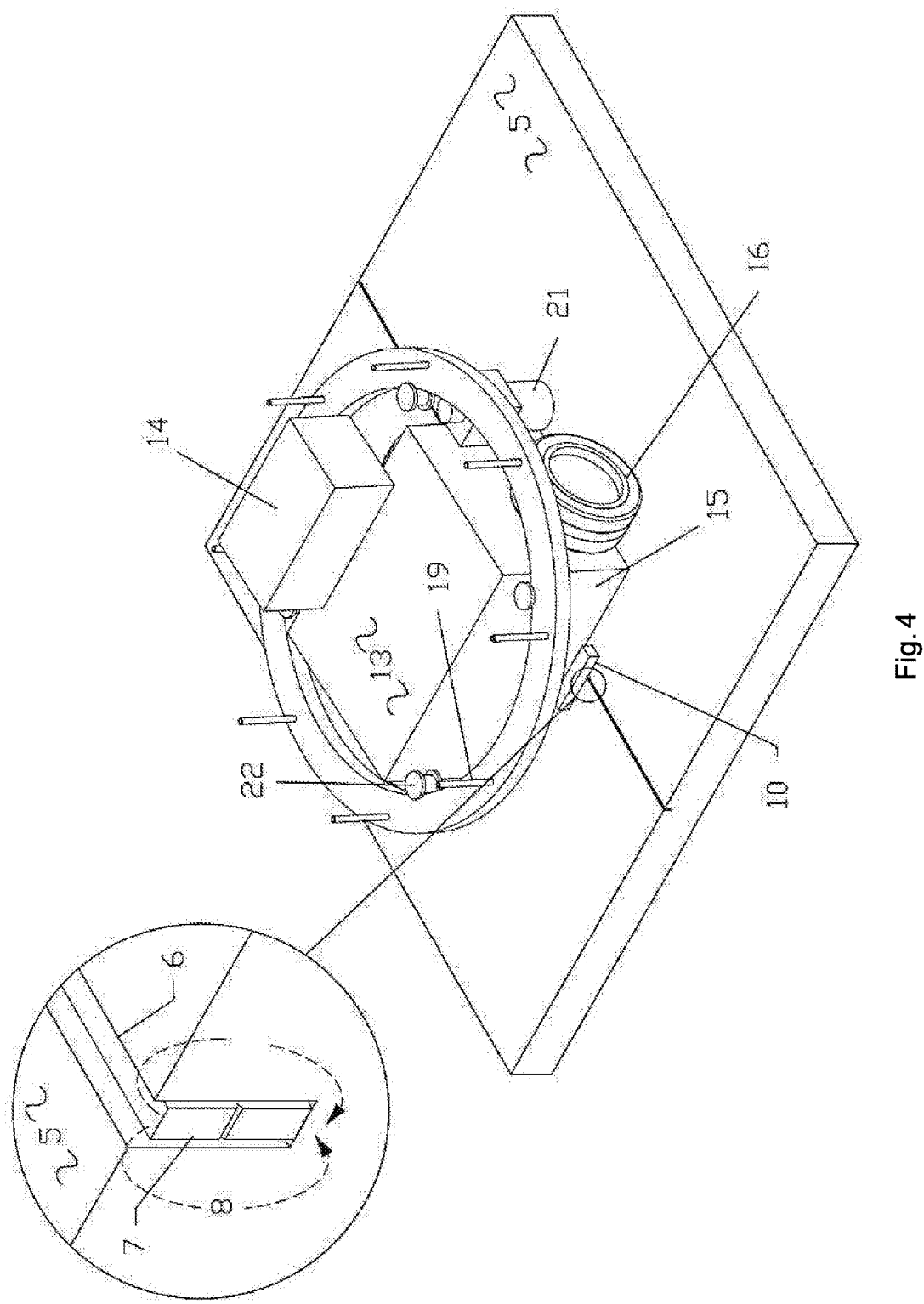
FIG. 4 is a perspective view of the vehicle without its skirt and showing a close-up view of the magnetic guiding element.
Figure 5:
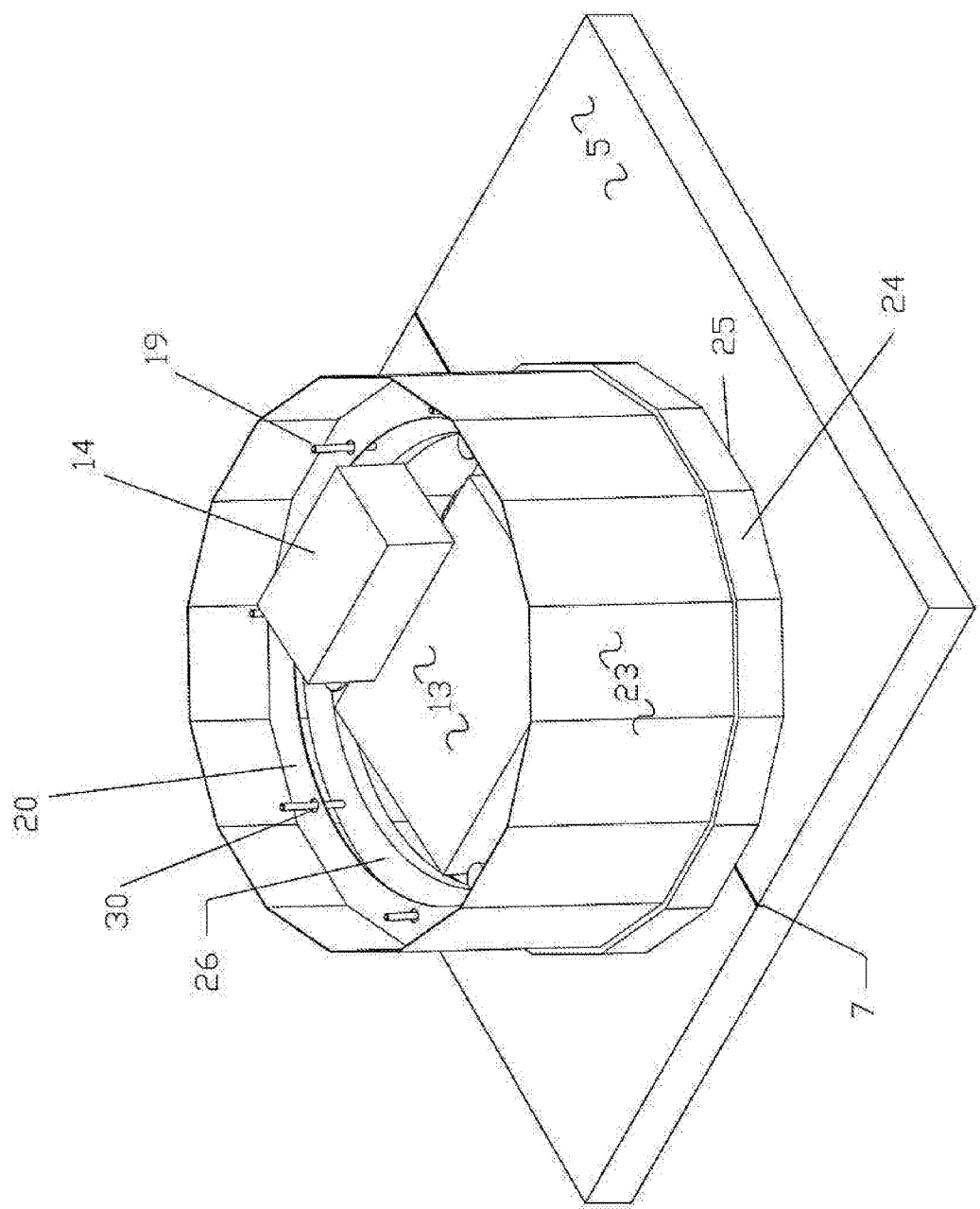
FIG. 5 is a perspective view of the vehicle showing.

The vehicle 9 is configured to push feed 2 laterally towards animals 4, as illustrated in FIG. 1. The vehicle 9 comprises a skirt 20 rotatably driven by a skirt drive 21 which is electrically powered by a battery system 13. FIG. 2 shows the skirt 20 mounted on the skirt carrier (now shown) and FIG. 3 shows the skirt carrier 26 without the skirt mounted thereon. The rotation of the skirt 20 pushes the feed 2 located in front of the vehicle towards the sides of the skirt 23. The direction of rotation of the skirt 20 can be clockwise or counter clockwise and can be selected by programming in the control unit 14 or through the magnetic tags 29. The direction of rotation is determined preferably to push the feed 2 closer to animals 4. For example, if the animals and/or the feeding fence are located to the left of the vehicle, the rotation will be counter clockwise; and if the animals and/or the feeding fence are located to the right of the vehicle, the rotation will be clockwise.

Figure 15:
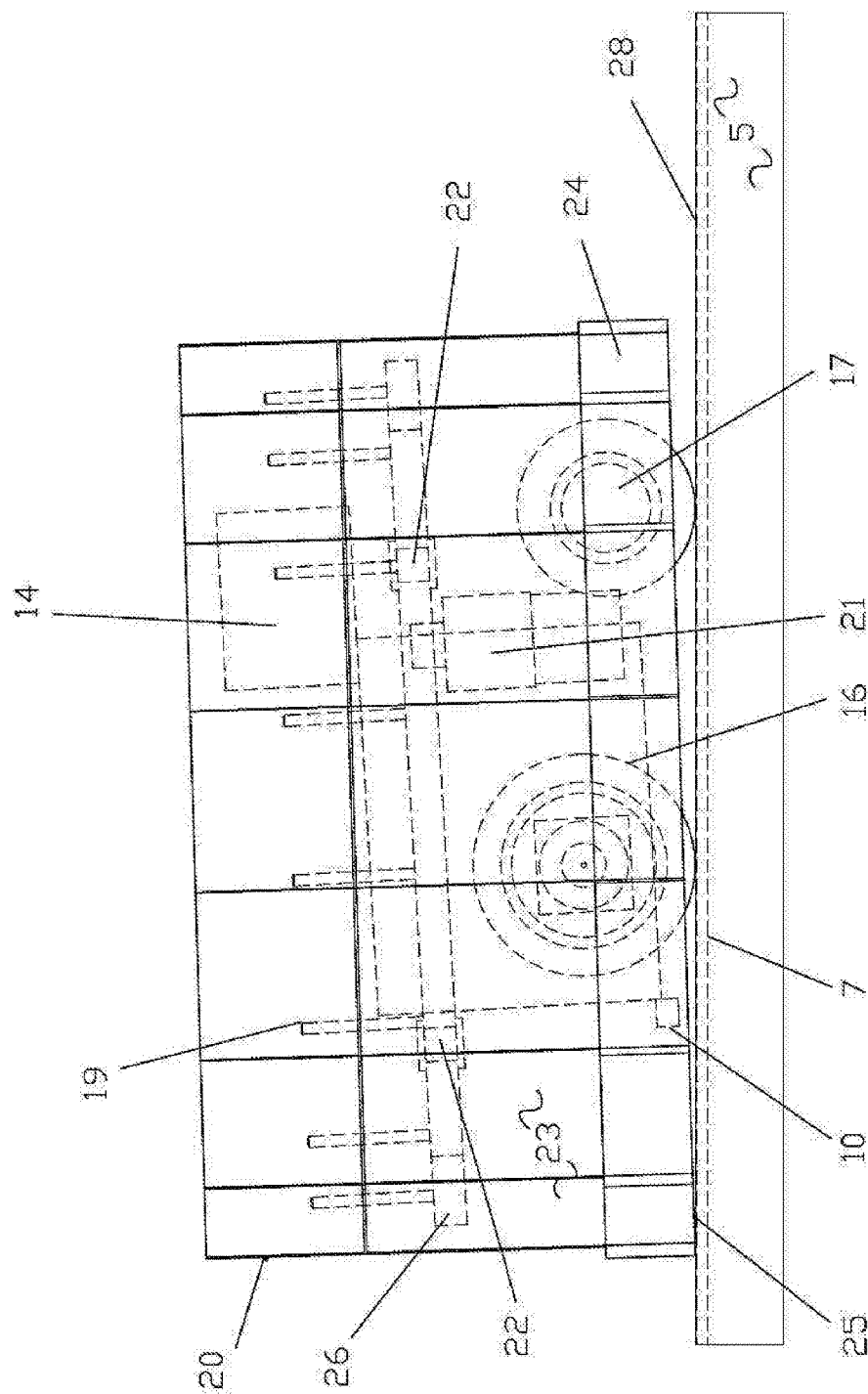
FIG. 15 is a side view of the vehicle showing the skirt bottom edge having a permanent contact with the floor at a 0° angle.
Figure 16:
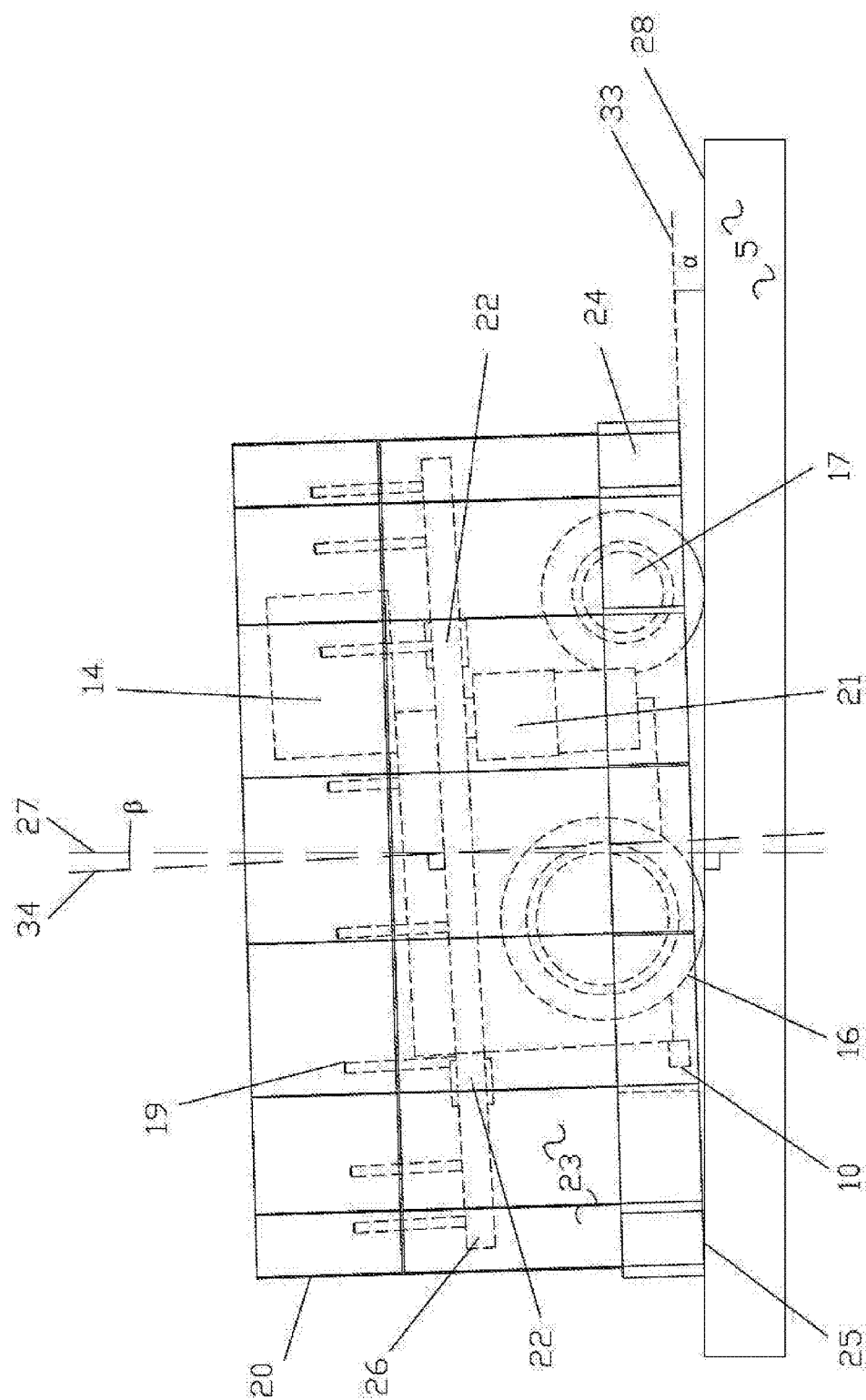
FIG. 16 is a side view of the vehicle showing the skirt bottom edge having a permanent contact with the floor at a 5° angle.

Preferably, the skirt 20 is positioned at an angle "α" or "alpha" between the floor 5 and the bottom portion of the skirt 25 located at the front of the vehicle. For example, the angle α is the angle formed between the horizontal axis 28 and the skirt bottom axis 33, as illustrated in FIG. 16. The angle α may vary between 0 to 10 degrees but is preferably greater than 1 degree so that only the skirt bottom edge 25 at the front of the vehicle touches the floor 5. It will be understood that given the rotation of the skirt, the entire bottom portion of the skirt touches the floor, however when the skirt is tilted, only a portion of the skirt, at a given time, will touch the floor. In the case where the skirt 20 is tilted with respect to the horizontal axis 28, as shown in FIGS. 15 and 16, the lowest point of the vehicle 25 is centered on the central axis formed by the magnetic guiding element. By centering the lowest point 25 on the central axis 11 this provides an ideal push for the skirt rotation, in a clockwise or counter clockwise direction, without changing the configuration of the mechanics of the vehicle 9. Also, the skirt 20 is preferably posititioned at an angle "β" or beta between the vertical axis 27 and the skirt carrier axis 34 (as shown in FIG. 16). The angle β may vary between 0 to 10 degrees but is preferably greater than 1 degree.

Obtaining such angles α and β can be done several ways, for example by tilting the skirt drive 21 with respect to the horizontal axis 28 (as shown in FIGS. 15 and 16), such that the skirt carrier bearings 22 in the front of the vehicle are lower than the skirt carrier bearings 22 in the back of the vehicle, relative to the horizontal axis 28 and the skirt carrier 26 supporting the skirt 20 is thus also tilted to the front. The angles can also be obtained by adding rigid or flexible stops (not shown in figures) between the skirt carrier 26 and the skirt 20. For example, these stops can be springs that are inserted over the pins 19 of the skirt carrier 26 prior to inserting the drive holes 30 of the skirt over the pins 19.

It will be understood that the operating principle also applies without any angle of the skirt carrier 26 and/or angle of the skirt 20 (e.g. angles α and β both being 0 degrees). In this case, all portions of the skirt bottom edge (i.e. lower perimeter of the skirt) 25 touches the floor 5. In all configurations, the vehicle 9 have a permanent point of contact with the floor via the skirt bottom edge 25 such that the effect of lateral push will be maintained. However without any angle there may be greater resistance to the movement of the vehicle 9.

The skirt 20 is an important element for the feed 2 displacement. Its shape is configured to increase lateral displacement of feed. Other known feed pushing vehicles use a cylinder- or cone-shaped skirt as outer surface of push. In an embodiment, the skirt is prism shaped. The advantage of this form is the effect of deviation of the skirt wall 23 which provides a gripping surface to the feed 2 and greatly improves the action of lateral displacement of feed 2. The skirt shape of the presently disclosed vehicle is that of regular hexadecagon, as shown for example in FIGS. 2 and 5. It will be understood that other prismatic shapes which improve the lateral displacement of the feed 2 may be contemplated.

The drive of the rotation of the skirt 20 is performed using a skirt drive 21 to which is mounted the skirt carrier 26 that supports the skirt 20. It will be understood however that other known mechanisms to drive rotation of the skirt may also be used. Referring to FIGS. 2 and 3, the skirt carrier 26 is driven in rotation by the skirt drive 21 and supported by skirt carrier bearings 22, for example ball bearings.

Skirt pins 19 are fixed on the skirt carrier 26. They extend upwardly and are evenly placed around the skirt carrier's circumference, as shown in FIGS. 2-5. These skirt pins 19 provide the means of transmitting the rotational drive of the skirt carrier 26 to the skirt 20. The skirt 20 includes drive holes 30 configured to mate with the pins 19. The diameter of the drive holes 30 is larger than the diameter of the pins 19 to allow the nesting of the drive holes 30 of the skirt 20 in the pins 19. In this configuration, the skirt 20 is rotatably driven by the skirt drive 21 and its height is freely adjustable or movable according to the height of the floor or obstacles thereon, to ensure a permanent point of contact of the bottom edge 25 of the skirt flexible strip 24 with the floor 5.

The skirt disclosed herein is configured to push feed lying on the floor and weighing for example up to 20 kg, 50 kg, 75 kg, 100 kg, 125 kg, 150 kg, 175 kg or 200 kg.

Figure 17:
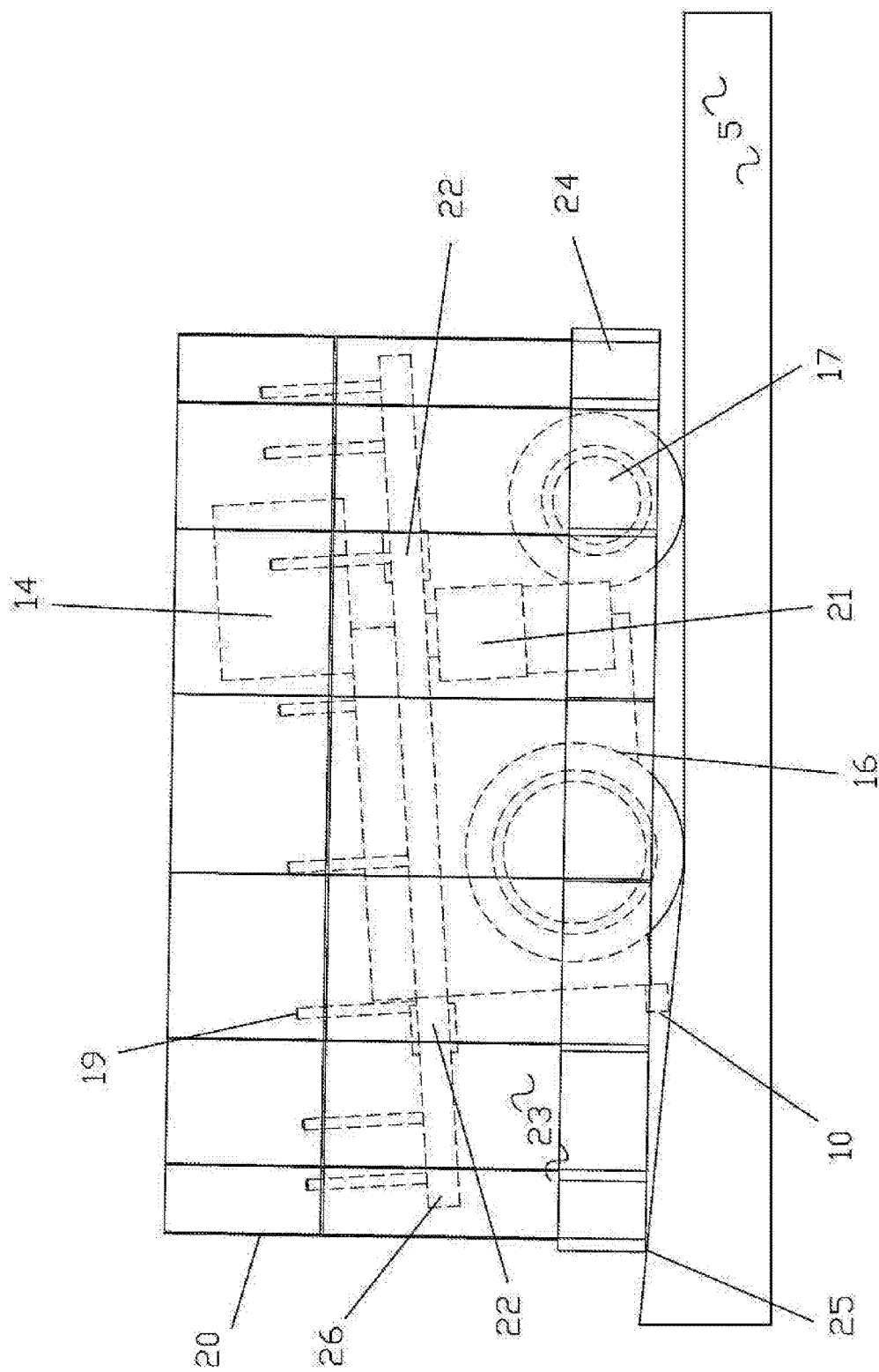
FIG. 17 is a side view of the vehicle showing the skirt bottom edge having a permanent contact with the floor during an angle deviation change (concave angle–downhill to flat).

In operation, referring now to FIG. 17, when an obstacle or a difference in height on the floor 5 occurs, the bottom edge 25 of the flexible strip of skirt 24 following the floor 5 and the skirt 20 move in relation to the vehicle frame 15, while continuously maintaining a point of contact between the bottom edge 25 flexible strip of skirt 24 and the floor 5. This feature is advantageous because the bottom of the flexible strip of skirt 25 is permanently in contact with the floor 5 regardless of the variations in the surface of the floor 5. This is also an advantage over existing feed pushing vehicles that cannot adjust themselves in response to a floor deviation without being reprogrammed. The operation of the vehicle 9 herein disclosed is thus simpler, more reliable and more economic.

For example, the pressure of the bottom of the skirt 25 exerted on the floor can be about 1 to 50 or about 2 to 50 kg to assure appropriate sweeping of feed. Accordingly, the vehicle and system herein disclosed provide numerous advantages over known feed pushing vehicles. In particular, the present vehicle ensures reliable guidance, because at any time it is automatically positioned over the central axis 11 set up according to the reading by the control unit 14 of the sensor assembly 10 via its sensors 31. In addition, the floor is neatly free of feed, allowing safe passage of machinery of any kind, or of individuals, and/or animals. In addition, there is no accumulation of feed around the magnetic guiding element 7 because it is inserted within a groove 6 of the floor 5, thus keeping the area clean. Finally, the magnetic guiding element 7 is suitable for indoor as well as outdoor applications.

| List of components | |
|---|---|
| Reference numeral | Component |
| 1 | Feeding fence |
| 2 | Feed |
| 3 | Feed alley |
| 4 | Animal |
| 5 | Floor |
| 6 | Floor Groove |
| 7 | Magnetic guiding element |
| 8 | Magnetic field |
| 9 | Vehicle |
| 10 | Sensor assembly |
| 11 | Central axis |
| 12 | Charging station |
| 13 | Battery system |
| 14 | Control unit |
| 15 | Frame |
| 16 | Drivable wheel |
| 17 | Support Wheel |
| 18 | Electrical drive motor |
| 19 | Pin |
| 20 | Skirt |
| 21 | Skirt drive |
| 22 | Skirt carrier bearings |
| 23 | Skirt wall |
| 24 | Skirt Flexible strip |
| 25 | Skirt bottom edge |
| 26 | Skirt carrier |
| 27 | Vertical axis |
| 28 | Horizontal axis |
| 29 | Magnetic tag |
| 30 | Skirt drive hole |
| 31 | Sensor |
| 32 | Magnetic tag groove |
| 33 | Skirt bottom axis |
| 34 | Skirt carrier axis |
| Alpha (α) | Angle formed between horizontal axis and skirt bottom axis |
| Beta (β) | Angle formed between vertical axis and skirt carrier axis |

While a description was made with particular reference to the specific embodiments, it will be understood that numerous modifications thereto will appear to those skilled in the art.

The scope of the claims should not be limited by specific embodiments and examples provided in the present disclosure and accompanying drawings, but should be given the broadest interpretation consistent with the disclosure as a whole.

What is claimed is:

1. An autonomous vehicle for pushing feed lying on a floor, comprising
a frame;
a skirt rotatably connected to the frame, wherein a bottom portion of the skirt continuously contacts the floor to push the feed;
a sensor assembly mounted to the frame for detecting a magnetic field emitted from a magnetic guiding element inserted in the floor, the magnetic guiding element forming a predetermined path, and for determining a position of the vehicle relative to the magnetic guiding element; and
a control unit mounted to the frame for directing rotation of the skirt and for guiding the vehicle along the predetermined path,
wherein the sensor assembly is configured to detect a magnetic field emitted from a magnetic tag inserted in the floor, and in response the control unit is configured to instruct the vehicle to change rotation direction of the skirt and/or displacement velocity, and wherein the magnetic tag has a polarity opposite to that of the magnetic guiding element.

2. An autonomous vehicle for pushing feed lying on a floor, comprising
a frame;
a skirt rotatably connected to the frame, wherein a bottom portion of the skirt continuously contacts the floor to push the feed;
a sensor assembly mounted to the frame for detecting a magnetic field emitted from a magnetic guiding element inserted in the floor, the magnetic guiding element forming a predetermined path, and for determining a position of the vehicle relative to the magnetic guiding element; and
a control unit mounted to the frame for directing rotation of the skirt and for guiding the vehicle along the predetermined path,
wherein the sensor assembly is configured to detect a magnetic field emitted from a magnetic tag inserted in the floor, the magnetic tag providing instructions to the vehicle to change rotation direction and/or displacement velocity.

3. The vehicle of claim 1, wherein the skirt connected to the frame is freely translatable in a vertical direction relative to the frame to allow continuous contact with the floor.

4. The vehicle of claim 2, wherein the height of the skirt relative to the frame is self-adjustable to allow continuous contact with the floor.

5. The vehicle of claim 2, wherein the skirt is tilted towards a front portion of the vehicle such that the bottom portion of the skirt continuously contacts the floor at the front portion of the vehicle.

6. The vehicle of claim 2, wherein the skirt is tilted towards a front portion of the vehicle and towards a direction of movement of the vehicle along the predetermined path such that the bottom portion of the skirt continuously contacts the floor at the front portion of the vehicle and towards the direction of movement along the predetermined path.

7. The vehicle of claim 2, wherein the skirt is tilted towards a direction of movement of the vehicle along the predetermined path such that the bottom portion of the skirt continuously contacts the floor towards the direction of movement.

8. The vehicle of claim 2, wherein the skirt is tilted at an angle α of about 0.1° to about 10° with respect to an axis defined by the floor.

9. The vehicle of claim 2, wherein the skirt is tilted at an angle α of about 0.5° to about 5° with respect to an axis defined by the floor.

10. The vehicle of claim 2, wherein the skirt is tilted at an angle α of about 1° to about 5° with respect to an axis defined by the floor.

11. The vehicle of claim 2, wherein the skirt is tilted at an angle β of about 0.1° to about 10° with respect to an axis perpendicular to the floor.

12. The vehicle of claim 8, wherein the skirt is tilted at an angle β of about 0.5° to about 5° with respect to an axis perpendicular to the floor.

13. The vehicle of claim 5, wherein the bottom portion of the skirt continuously contacts the floor at the front portion of the vehicle adjacent to the magnetic guiding element.

14. The vehicle of claim 2, wherein the skirt carrier is secured to the frame and the skirt is freely translatable in a vertical direction with respect to the skirt carrier.

15. The vehicle of claim 2, wherein when the vehicle deviates from the predetermined path such that a shift in the magnetic field position relative to a predetermined portion of the sensor assembly is detected by the sensor assembly, the control unit instructs the vehicle to reposition itself along the predetermined path.

16. The vehicle of claim 2, wherein when the vehicle deviates from the predetermined path such that the magnetic field is no longer detected by the sensor assembly, the control unit instructs the vehicle to stop moving.

17. The vehicle of claim 2, wherein the sensor assembly comprises a plurality of Hall Effect sensors.

18. The vehicle of claim 2, wherein the predetermined path is a closed loop.

19. A method for pushing feed lying on a floor using an autonomous vehicle, comprising:
   driving the vehicle across a predetermined path on the floor, the predetermined path being formed by a magnetic guiding element inserted within a first groove of the floor and at least one magnetic tag inserted in at least one second groove of the floor;
   controlling displacement of the vehicle by:
      measuring a magnetic field emitted by the magnetic guiding element,
      determining the position of the vehicle relative to the magnetic guiding element,
      providing instructions to the vehicle to change rotation direction and/or displacement velocity, and
      correcting the position of the vehicle if a deviation relative to the magnetic guiding element is detected; and
   rotating a skirt of the vehicle to push the feed, wherein a bottom portion of the skirt continuously contacts the floor.

20. A kit for pushing feed comprising:
(i) magnetic guiding element dimensioned to be inserted in a floor;
(ii) at least one a magnetic tag dimensioned to be inserted in the floor; and
(iii) an autonomous vehicle for pushing feed lying on the floor, comprising
   a frame;
   a skirt rotatably connected to the frame, wherein a bottom portion of the skirt is dimensioned to continuously contact the floor to push the feed;
   a sensor assembly mounted to the frame for detecting a magnetic field emitted from said magnetic guiding element, the magnetic guiding element forming a predetermined path, and for determining a position of the vehicle relative to the magnetic guiding element; and
   a control unit mounted to the frame for directing rotation of the skirt and for guiding the vehicle along the predetermined path,
   wherein the sensor assembly is configured to detect a magnetic field emitted from said at least one magnetic tag, the at least one magnetic tag providing instructions to the vehicle to change rotation direction and/or displacement velocity.

21. The kit of claim 20, further comprising a charging station for recharging the vehicle.

* * * * *